(12) United States Patent
Fiedler

(10) Patent No.: US 8,368,494 B2
(45) Date of Patent: Feb. 5, 2013

(54) MAGNETIC COUPLING DEVICE

(75) Inventor: Joachim Fiedler, Berlin (DE)

(73) Assignee: FIDLOCK, GmbH, Hannover (DE)

( * ) Notice: Subject to any disclaimer, the term of this patent is extended or adjusted under 35 U.S.C. 154(b) by 119 days.

(21) Appl. No.: 12/745,808

(22) PCT Filed: Dec. 4, 2008

(86) PCT No.: PCT/DE2008/002028
§ 371 (c)(1),
(2), (4) Date: Sep. 7, 2010

(87) PCT Pub. No.: WO2009/071071
PCT Pub. Date: Jun. 11, 2009

(65) Prior Publication Data
US 2011/0001025 A1    Jan. 6, 2011

(30) Foreign Application Priority Data

Dec. 4, 2007 (DE) .......................... 10 2007 058 188

(51) Int. Cl.
*H01F 7/20* (2006.01)
(52) U.S. Cl. ............................................ 335/285; 269/8
(58) Field of Classification Search .......... 335/285–291,
335/295; 295/65.5; 269/8
See application file for complete search history.

(56) References Cited

U.S. PATENT DOCUMENTS

| | | | | |
|---|---|---|---|---|
| 3,477,050 A * | 11/1969 | Hinger | .......................... | 335/285 |
| 5,673,833 A | 10/1997 | Ortlieb | | |
| 6,076,873 A * | 6/2000 | Jung | ............................. | 294/65.5 |
| 6,707,360 B2 * | 3/2004 | Underwood et al. | ......... | 335/288 |
| 7,009,480 B2 * | 3/2006 | Tsui et al. | ..................... | 335/287 |
| 7,161,451 B2 * | 1/2007 | Shen | .............................. | 335/289 |
| 7,843,296 B2 * | 11/2010 | Fullerton et al. | .............. | 335/306 |
| 2001/0026204 A1 * | 10/2001 | Petro | ............................. | 335/229 |
| 2010/0328001 A1 * | 12/2010 | Harjes | ........................... | 335/285 |

FOREIGN PATENT DOCUMENTS

| | | |
|---|---|---|
| DE | 2435123 A1 | 2/1976 |
| DE | 2513001 A1 | 10/1976 |
| DE | 3927086 A1 | 1/1991 |
| DE | 9207525 U1 | 10/1992 |
| EP | 0866476 A1 | 9/1998 |

* cited by examiner

*Primary Examiner* — Bernard Rojas
(74) *Attorney, Agent, or Firm* — The Webb Law Firm

(57) ABSTRACT

A hand-actuated magnetic coupling or closing device, consisting of elements that are integrally connected either to the objects that are to be coupled or applied to the objects. The coupling device comprises the following characteristics: Elements are coupled together by means of a coupling element; the coupling element can be displaced in two degrees of freedom; in the first degree of freedom, the coupling element can be displaced about the play between a coupling position and a decoupling position; in the second degree of freedom, the coupling element can be moved in a sliding manner by means of an input actuation. A magnetic element is arranged and a magnetic system is arranged in the coupling element. In the second degree of freedom and by means of the input actuation, the coupling element is displaced from the coupling position, in which the coupling element is attracted into the decoupling position, in which the coupling element is repelled and displaced about the play in the first degree of freedom.

15 Claims, 27 Drawing Sheets

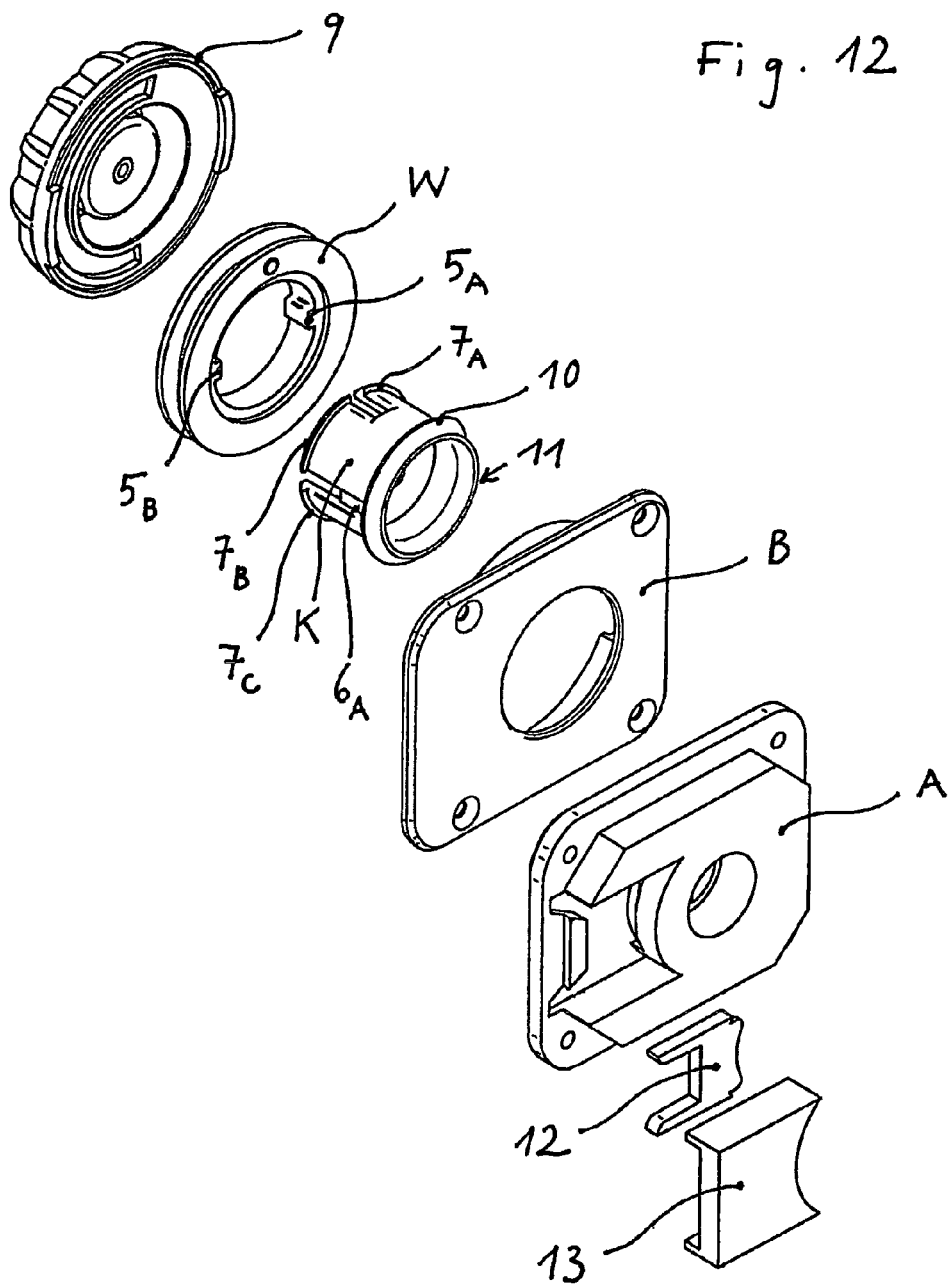

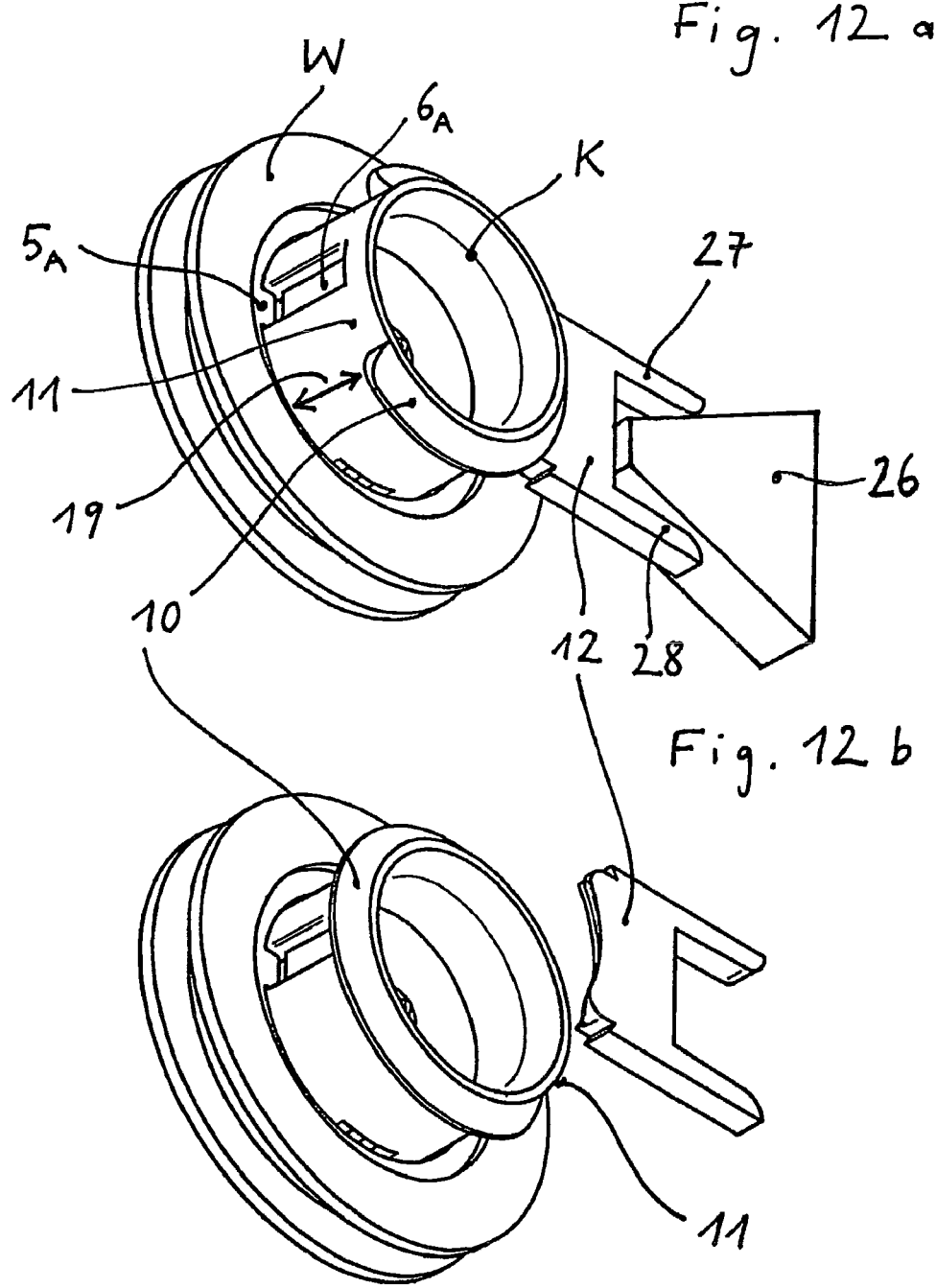

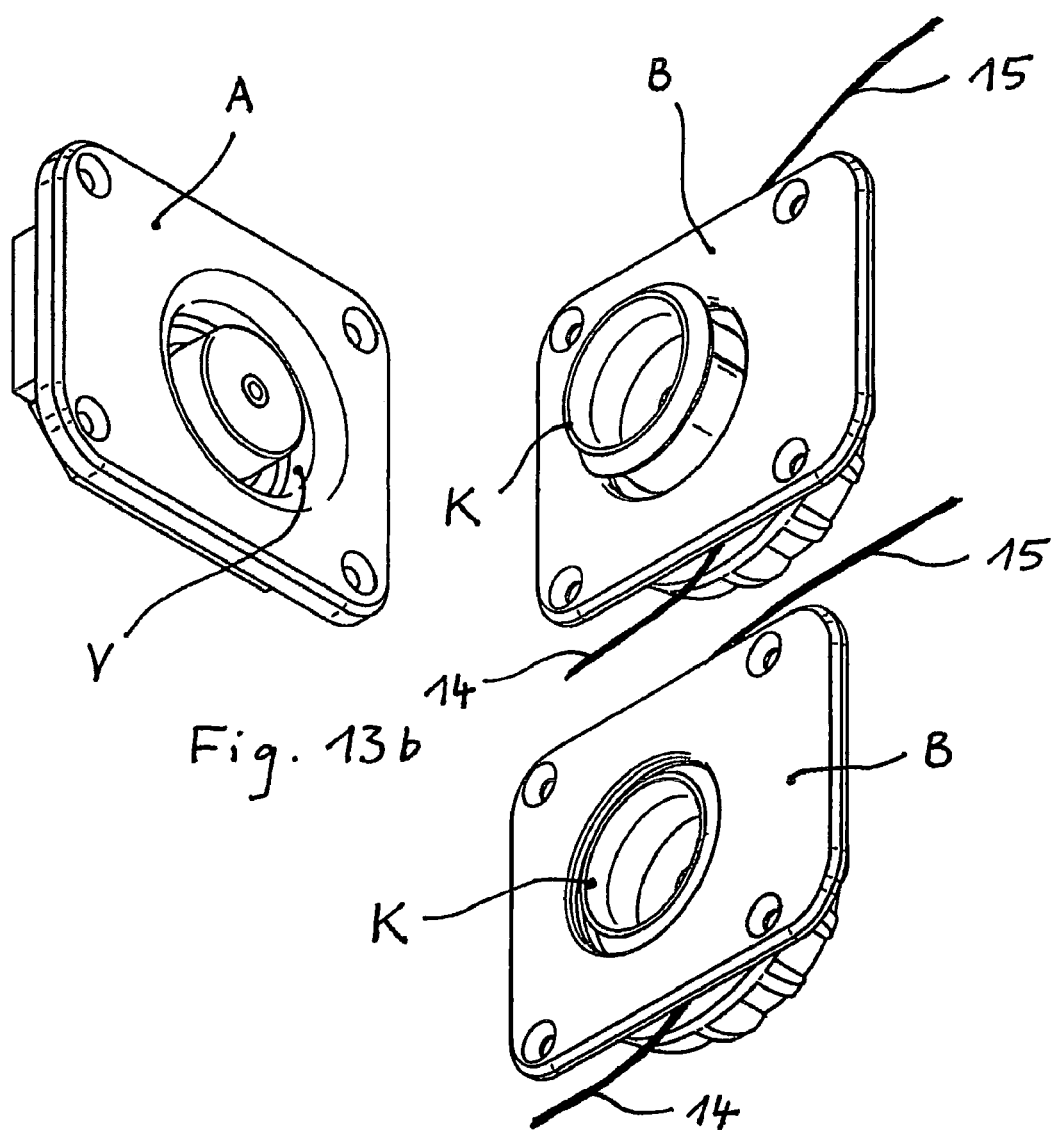

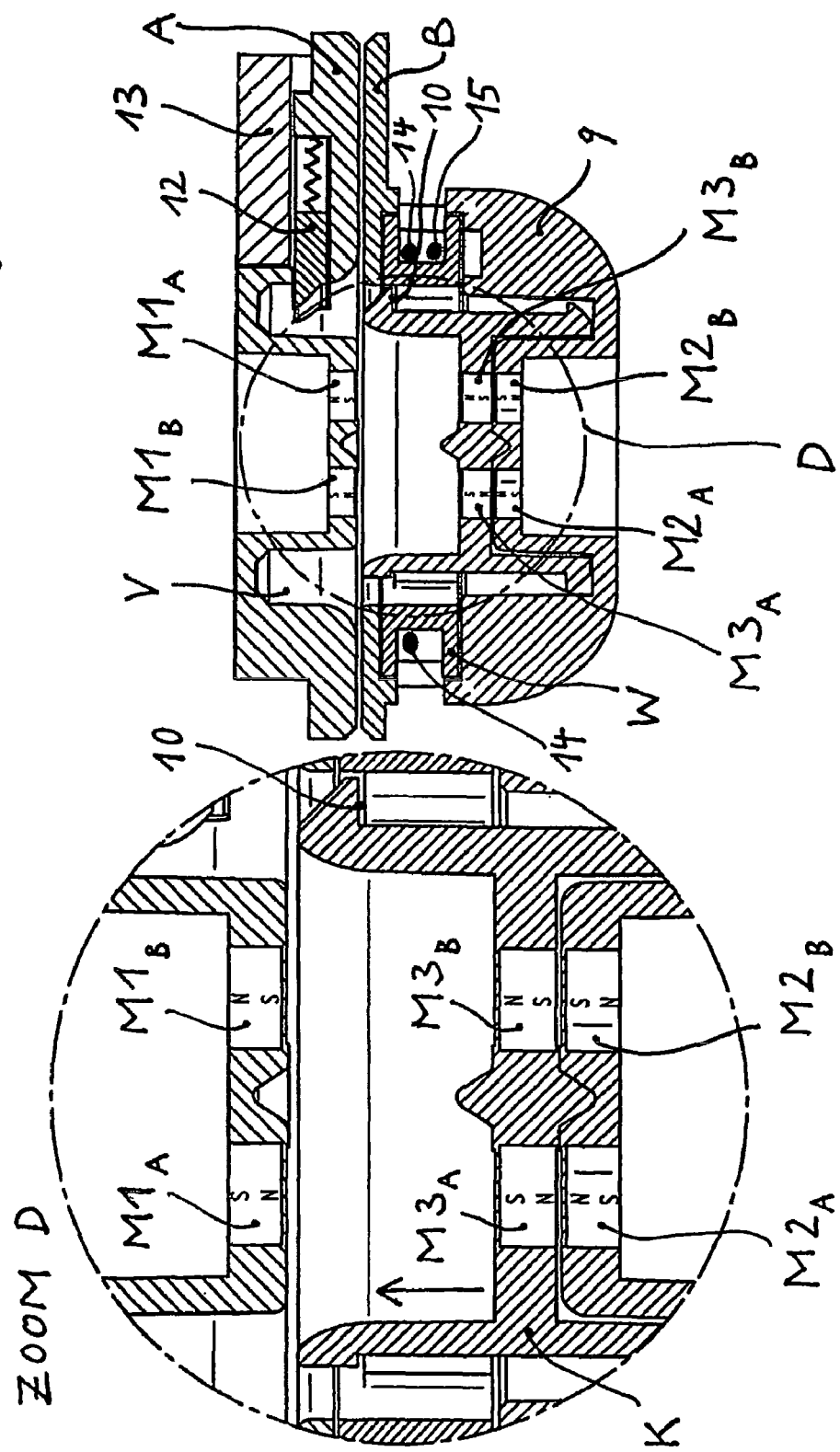

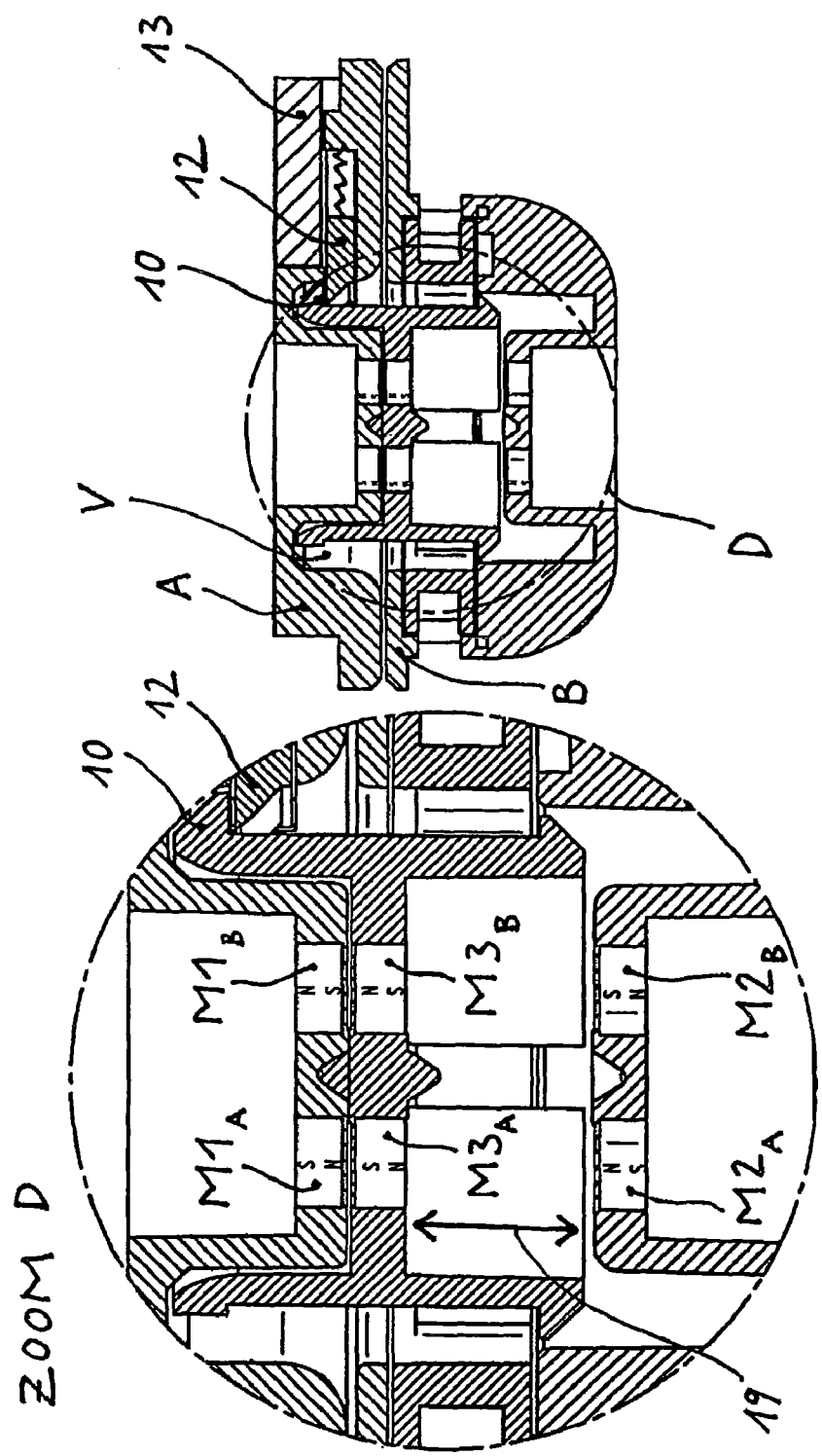

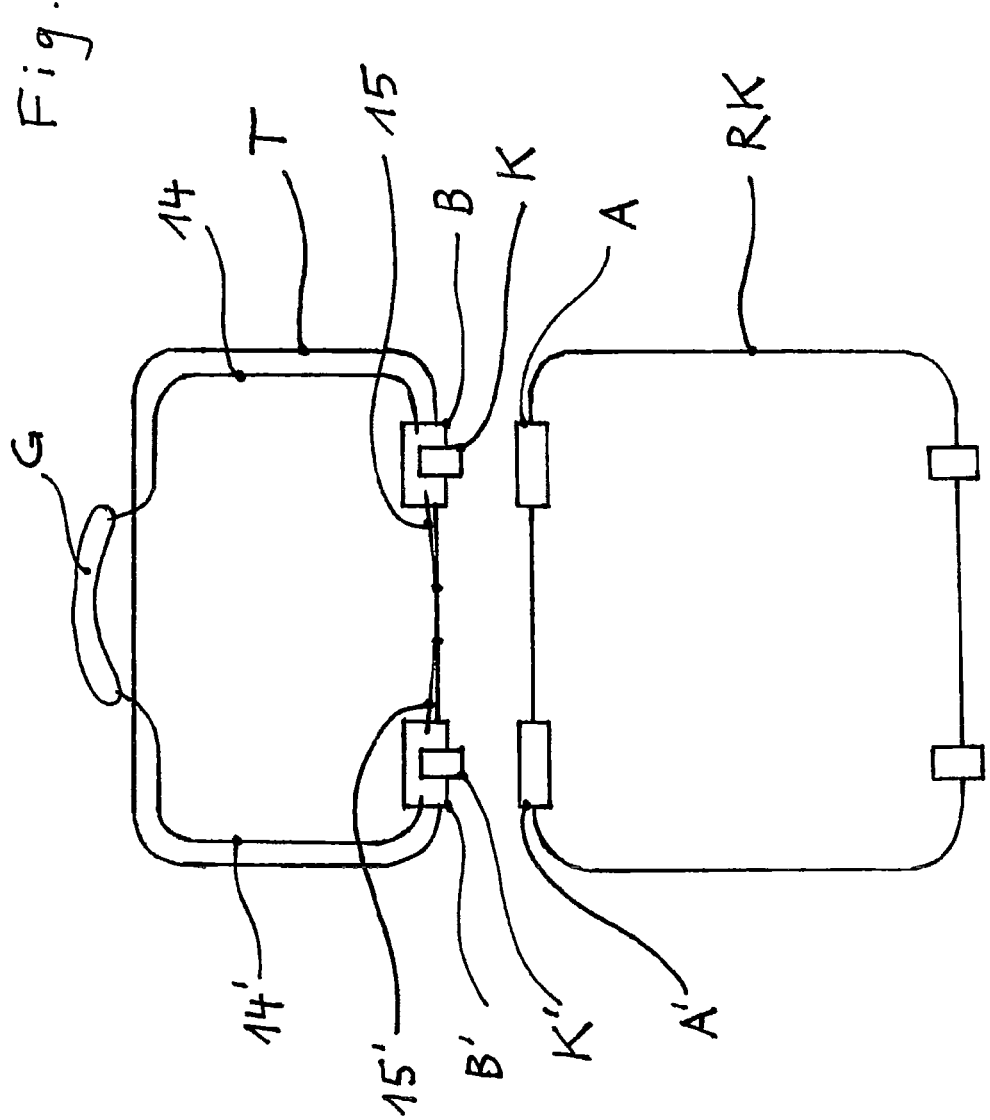

Fig. 18
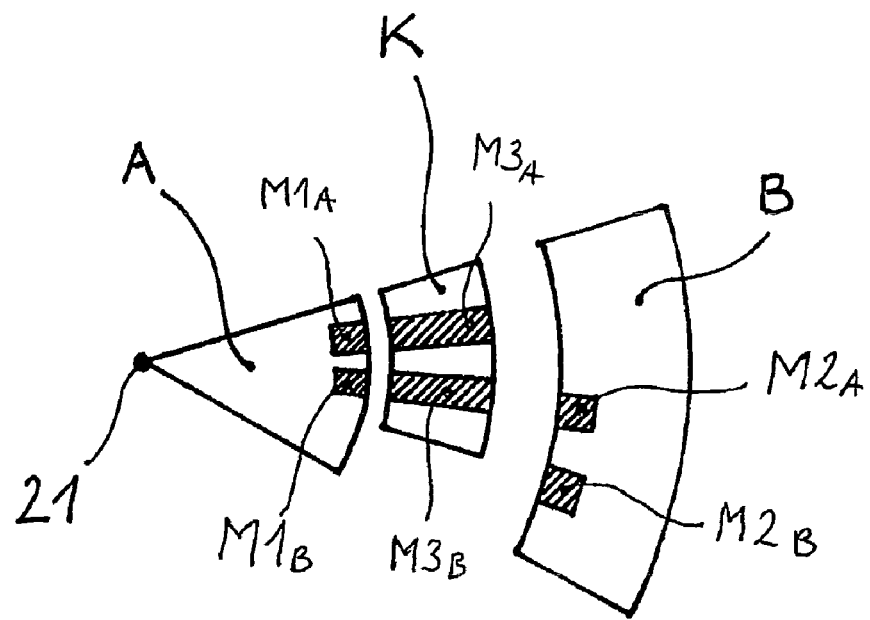
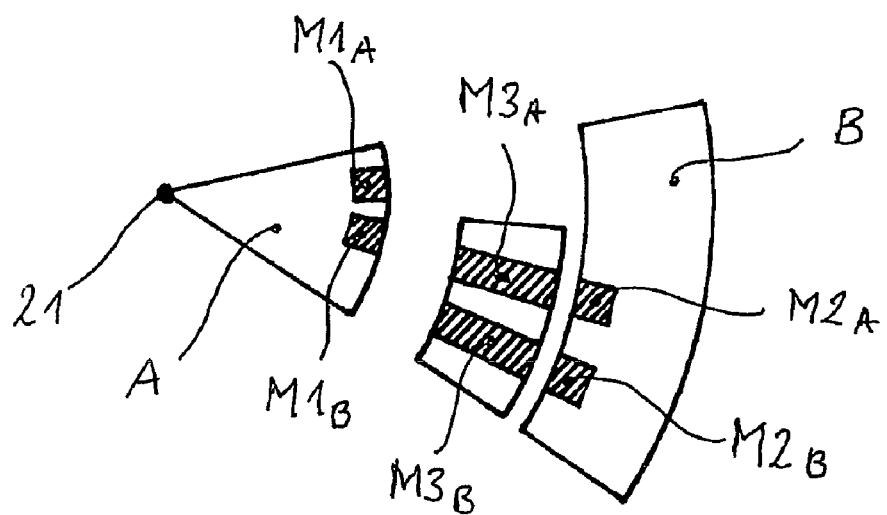

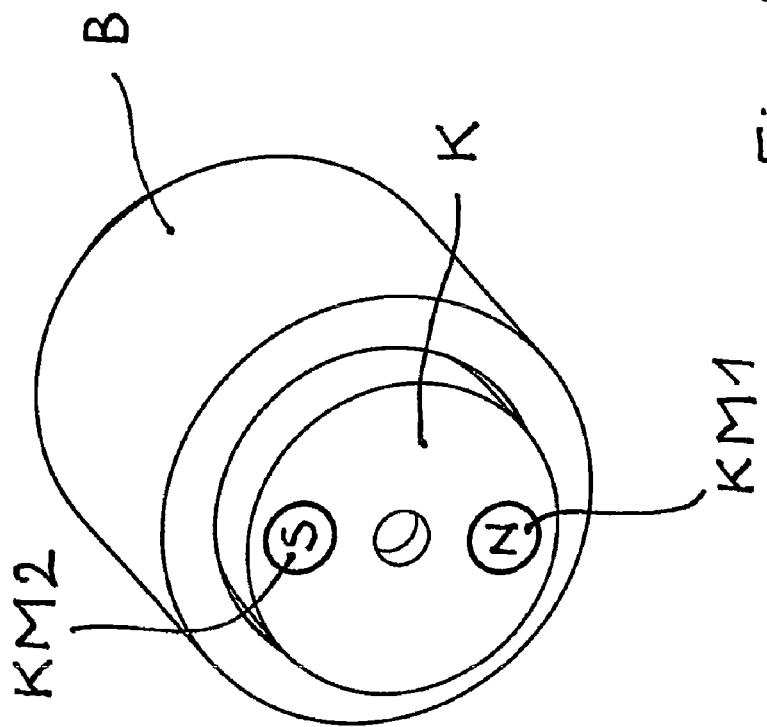
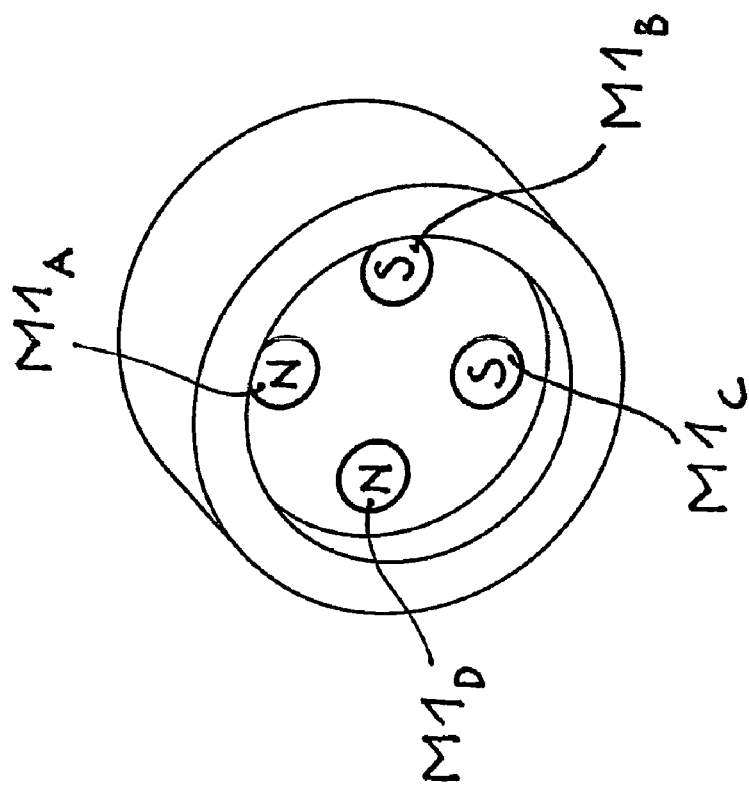
Fig. 23

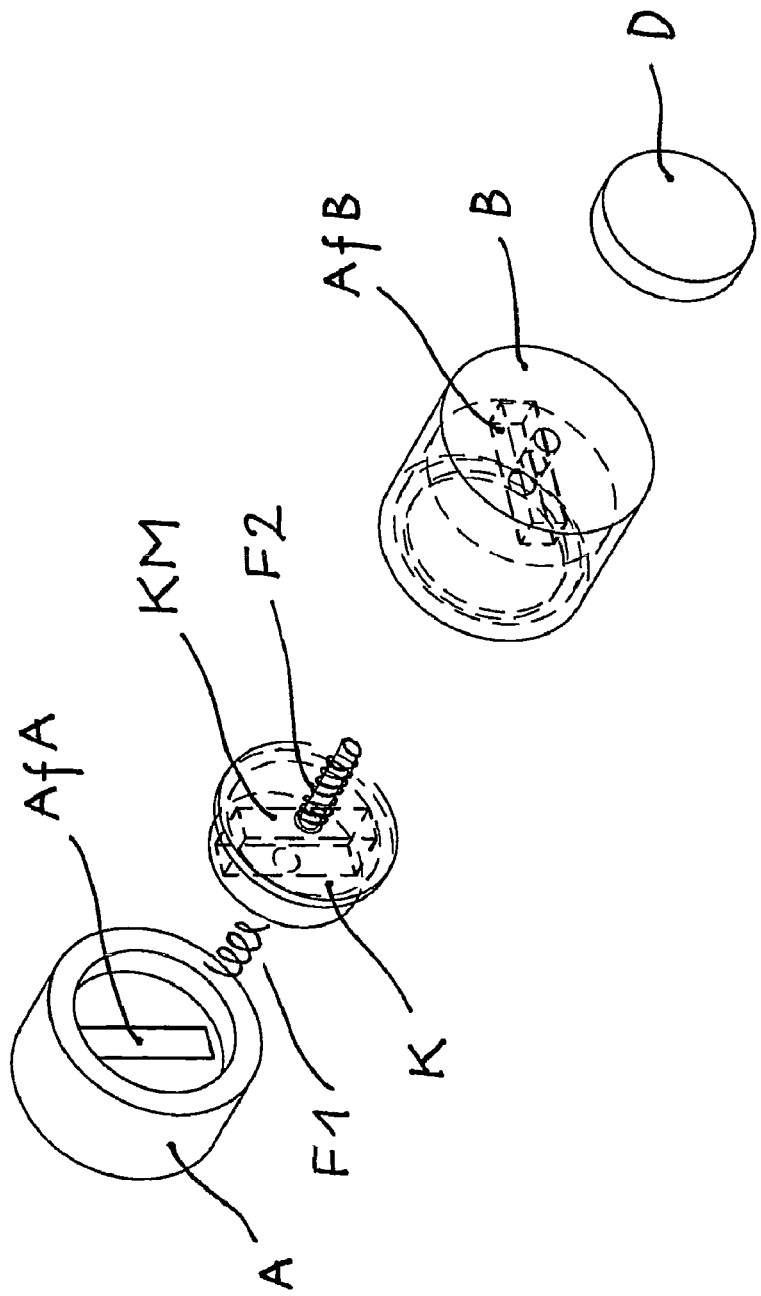

//MAGNETIC COUPLING DEVICE

CROSS-REFERENCE TO RELATED APPLICATION

This application is a National Phase Patent Application of International Patent Application Number PCT/DE2008/002028, filed on Dec. 4, 2008, which claims priority of German Patent Application Number 10 2007 058 188.4, filed on Dec. 4, 2007.

BACKGROUND OF THE INVENTION

Field of the Invention

This invention relates to a hand-actuated coupling or closing device which releasably mechanically connects two elements, in particular in objects of daily use such as the coupling of a bicycle bag with a bicycle, the coupling of a laptop bag with a suitcase, the coupling of two toolboxes with each other. However, it can also be used as closure between lid and base of a container, as closure of bags, doors or for coupling sliding doors and partition walls or in toys.

From the prior art, a multitude of such coupling devices are known, such as in a coupling construction for the attachment of bicycle bags to a bicycle (DE3927086 by Rixen, Kaul, Flammann). This is a hand-actuated coupling device with which a piece of luggage is attached to the bicycle. When mounting the same on the bicycle, the spring force of a spring catch must be overcome, which sometimes requires a disturbing amount of effort, and for demounting the same a spring catch must be unlocked at the same time and the piece of luggage must be removed, which sometimes requires a complicated coordination. In DE9207525 (Ortlieb) a bicycle bag with lockable hooks is attached to the luggage rack of a bicycle. The coordination of unlocking the hooks and removing the bag is solved quite well here, but the protruding hooks mounted on the bag are disturbing when the bag is carried on the shoulder.

To eliminate this deficiency, the protruding, disturbing portions of such coupling devices are provided with a cover. Another possibility consists in swiveling these portions into recesses. These solutions are awkward and expensive, i.e. not much comfortable for the user, since additional actions are required.

SUMMARY OF THE INVENTION

It is an object of the invention to provide a coupling device in which all protruding mounting portions are retracted into the bag or suitcase without any additional action, if possible, and which at the same time provides for an easy and comfortable coupling and decoupling of the two elements, i.e. for example of the bag from the suitcase.

According to a first embodiment, a magnetic coupling device is provided, consisting of an element A and an element B, wherein the elements A and B either are integrally connected with the objects to be coupled or are mounted on the objects, and the coupling device has the following features: Element A and element B are coupled by means of a coupling element K. The coupling element K is movable in element B in two degrees of freedom: In the first degree of freedom, the coupling element K can be moved about the play 19 between a coupling position and a decoupling position, in the second degree of freedom the coupling element K can be displaced by means of an input actuation. In the element A a magnetic system M1 with at least two magnets M1$a$ and M1$b$ or a magnet arrangement with two magnetic poles is arranged, and in the coupling element K a magnetic system M3 with the magnets M3$a$ and M3$b$ or a magnet arrangement with at least 4 magnetic poles is arranged, of which at least two magnetic poles are arranged on the front side of the coupling element K facing the magnetic system M1, wherein by means of the input actuation in the second degree of freedom the coupling element K is moved from the coupling position, in which the coupling element is in attraction to element A, into the decoupling position, in which the coupling element is in repulsion to the element A, in the first degree of freedom about the play 19. In the element B a magnetic system M2 with at least two magnets M2$a$ and M2$b$ or a magnet arrangement with two magnetic poles is arranged, and in the magnetic system M3 of the coupling element K at least two magnetic poles are arranged on the rear side facing the magnetic system M2, wherein by means of the input actuation in the second degree of freedom the coupling element K is moved from the coupling position, in which the coupling element is in repulsion to element B, into the decoupling position, in which the coupling element is in attraction to element B, in the first degree of freedom about the play 19.

According to a second embodiment, a magnetic coupling device is provided, consisting of an element A and an element B, wherein the elements A and B either are integrally connected with the objects to be coupled or are mounted on the objects, and the coupling device has the following features: Element A and element B are coupled by means of a coupling element K. The coupling element K is movable in element B in two degrees of freedom: In the first degree of freedom, the coupling element K can be moved about the play 19 between a coupling position and a decoupling position, in the second degree of freedom the coupling element K can be displaced by means of an input actuation. In the element A an armature AfA is arranged and in the coupling element K a magnet KM is arranged and between the same a spring F1 is arranged. By means of the input actuation in the second degree of freedom the coupling element K is moved from a position of maximum overlap of armature AfA and magnet KM and maximum attraction into a position of minimum overlap and minimum force of attraction. The spring F1 is dimensioned and arranged such that in the position of maximum overlap it is weaker than the maximum magnetic attraction of armature AfA and magnet KM, so that armature AfA and magnet approach each other, and in the condition of minimum overlap it is stronger than the minimum force of attraction between armature AfA and magnet KM, so that armature AfA and magnet KM repel each other by the spring F1, wherein by means of the input actuation in the second degree of freedom the coupling element K is moved from the coupling position, in which the coupling element is in attraction to element A, into the decoupling position, in which the coupling element is in repulsion to element A, in the first degree of freedom about the play 19. In the element B an armature AfA is arranged and between the coupling element K with the magnet KM and the armature AfB a spring F2 is arranged. By means of the input actuation in the second degree of freedom the coupling element K is moved from a position of maximum overlap of armature AfB and magnet KM and maximum attraction into a position of minimum overlap and minimum force of attraction. The spring F2 is dimensioned and arranged such that in the position of maximum overlap it is weaker than the maximum magnetic attraction of armature AfB and magnet KM, so that armature AfB and magnet approach each other, and in the condition of minimum overlap it is stronger than the minimum force of attraction between armature AfB and magnet KM, so that armature AfB and magnet KM repel each other by the spring F2, wherein by means of the input actuation in the second degree of freedom the coupling element K is moved from the coupling position, in which the coupling element is in repulsion to element B, into the decoupling position, in which the coupling element is in attraction to element B, in the first degree of freedom about the play 19.

According to a third embodiment, a magnetic coupling device is provided, consisting of an element A and an element B, wherein the elements A and B either are integrally connected with the objects to be coupled or are mounted on the objects, and the coupling device has the following features: Element A and element B are coupled by means of a coupling element K. The coupling element K is movable in element B in two degrees of freedom: In the first degree of freedom, the coupling element K can be moved about the play 19 between a coupling position and a decoupling position, in the second degree of freedom the coupling element K can be displaced by means of an input actuation. In the element A a magnetic system M1 with at least two magnets M1a and M1b or a magnet arrangement with two magnetic poles is arranged, and in the coupling element K the magnetic system M3 with the magnets M3a and M3b or a magnet arrangement with at least 2 magnetic poles is arranged, of which at least two magnetic poles are arranged on the front side of the coupling element K facing the magnetic system M1, wherein by means of the input actuation in the second degree of freedom the coupling element K is moved from the coupling position, in which the coupling element is in attraction to element A, into the decoupling position, in which the coupling element is in repulsion to element A, in the first degree of freedom about the play 19. In the element B an armature AfB is arranged and between the coupling element K with the magnetic system M3 and the armature AfB a spring F2 is arranged. By means of the input actuation in the second degree of freedom the coupling element K is moved from a position of maximum overlap of armature AfB and magnetic system M3 and maximum attraction into a position of minimum overlap and minimum attraction. The spring F2 is dimensioned and arranged such that in the position of maximum overlap it is weaker than the maximum magnetic attraction of armature AfB and magnetic system M3, so that armature AfB and magnet approach each other, and in the condition of minimum overlap it is stronger than the minimum force of attraction between armature AfB and magnetic system M3, so that armature AfB and magnetic system M3 repel each other by the spring F2, wherein by means of the input actuation in the second degree of freedom the coupling element K is moved from the coupling position, in which the coupling element is in repulsion to element B, into the decoupling position, in which the coupling element is in attraction to element B, in the first degree of freedom about the play 19.

According to another embodiment, the coupling element K is rotated by means of an input actuation in the second degree of freedom.

According to another embodiment, the coupling element K is linearly shifted by means of an input actuation in the second degree of freedom.

According to another embodiment, the coupling element K is swiveled on a circular path around the center 21 by means of an input actuation in the second degree of freedom.

According to another embodiment, the coupling element K prominently protrudes from the element B in the coupling position and forms a positive connection with a depression V in the element A, which mechanically secures the elements A and B against transverse pull.

BRIEF DESCRIPTION OF THE DRAWINGS

The idea of the invention shall subsequently be described with regard to the embodiments shown in the figures. Herein

FIGS. 11 to 15 show views of another embodiment of a rotary coupling device;

FIG. 15a shows a schematic view of a coupling device coupling a bag to a roller case;

FIG. 18 shows a view of a swivel coupling;

FIGS. 21 to 25 show views of another embodiment of a rotary coupling device.

DETAILED DESCRIPTION OF THE INVENTION

The invention will subsequently be explained in detail with reference to embodiments and schematic drawings.

Figure 1:
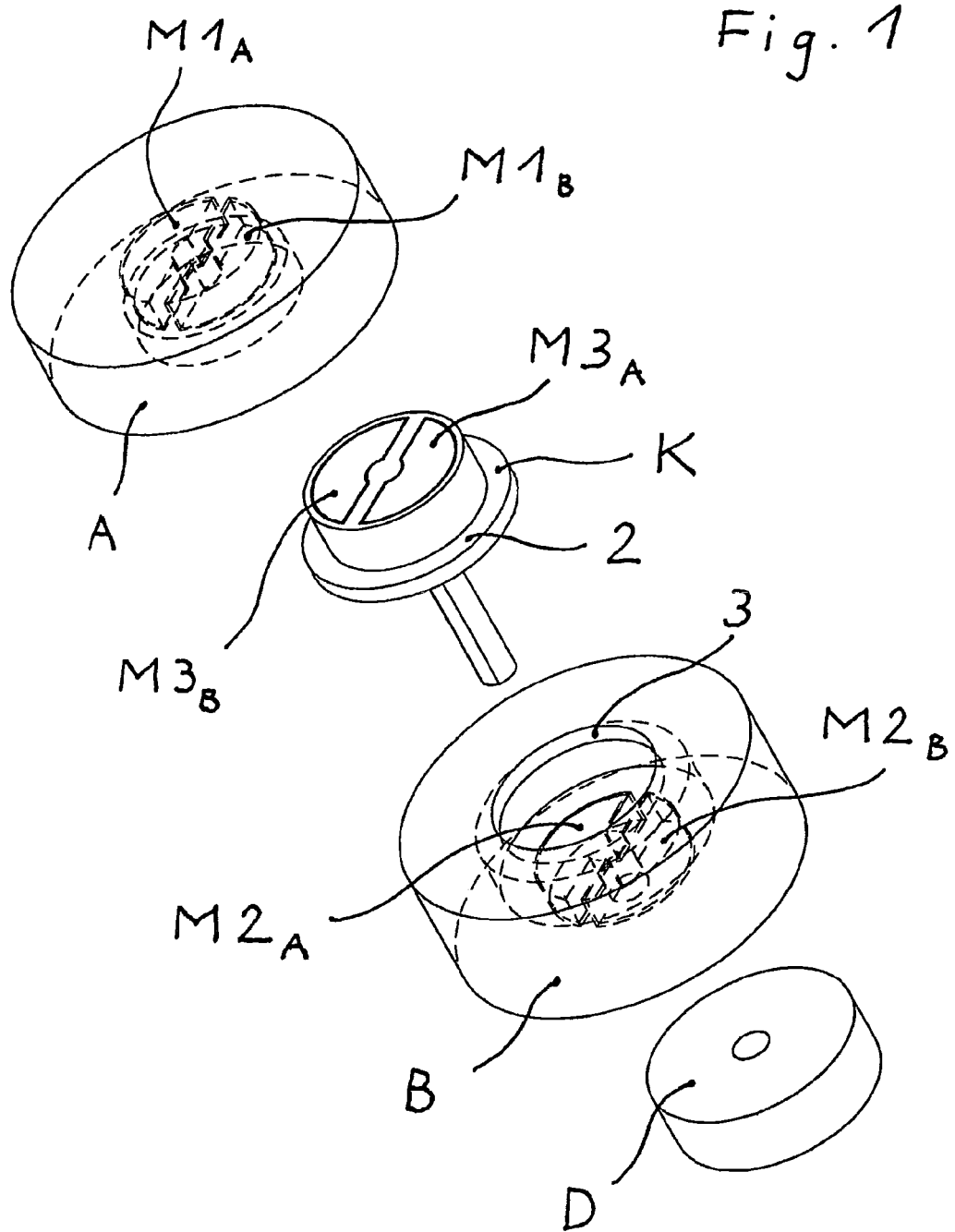
FIG. 1 shows an exploded representation of a rotary coupling device.

The invention will first be described with reference to a rotary coupling device:

FIG. 1 shows an exploded representation of a rotary coupling device, consisting of an element A with the magnetic system M1 comprising the magnets M1a and M1b and an element B with the magnetic system M2 comprising the magnets M2a and M2b. In element B, a coupling element K movable in two degrees of freedom is provided, which in a first degree of freedom is movable in axial direction about the play 19 limited by stop 2 and stop 3 and in a second degree of freedom can rotatably be actuated in element B via the turning handle D. In the coupling element K the magnetic system M3 comprising the magnets M3a and M3b is arranged with four magnetic poles, two of which each are unlike poles, on the front side and rear side.

Figure 2:
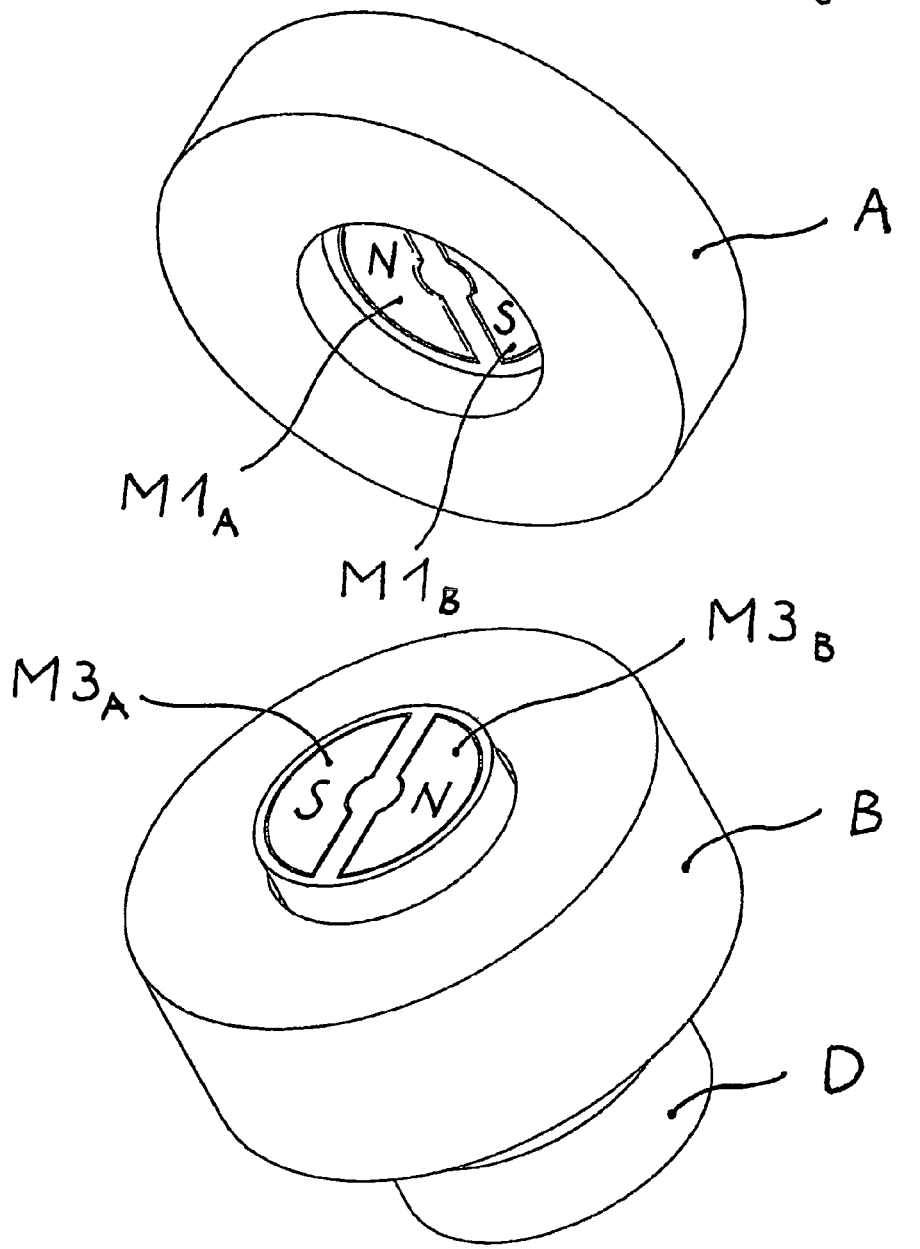
FIG. 2 shows a perspective view of the rotary coupling device with separate elements.

FIG. 2 shows a perspective view of the rotary coupling device with separate elements A and B, wherein the coupling element K is in the coupling position in which magnetic system M3 and magnetic system M2 are in repulsion and magnetic system M1 and magnetic system M3 are in attraction.

Figure 3:
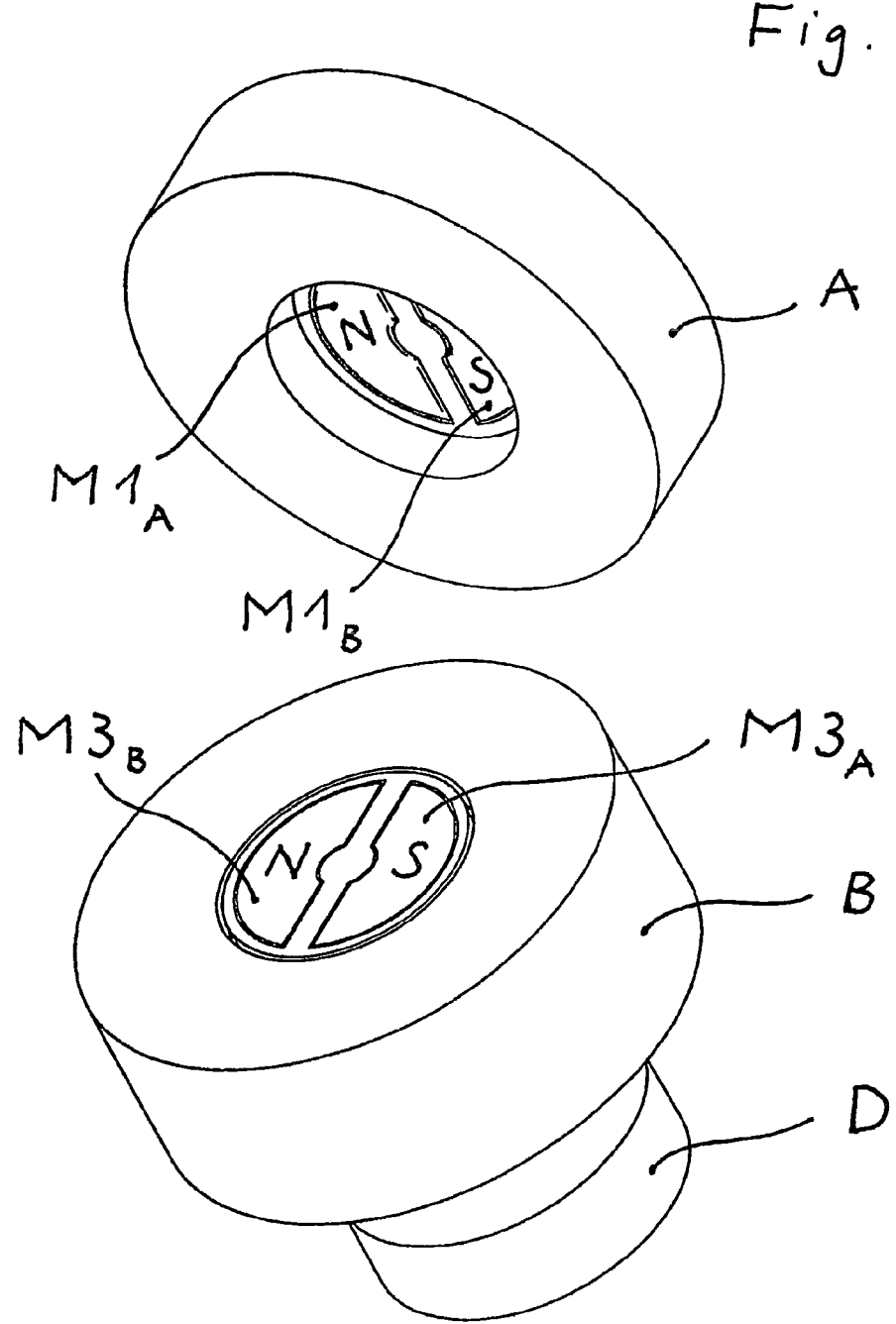
FIG. 3 shows another perspective view of the rotary coupling device with separate elements.

FIG. 3 shows a perspective view of the rotary coupling device with separate elements A and B, wherein the coupling element K is in the decoupling position in which magnetic system M3 and magnetic system M2 are in attraction and magnetic system M1 and magnetic system M3 are in repulsion.

Figure 4:
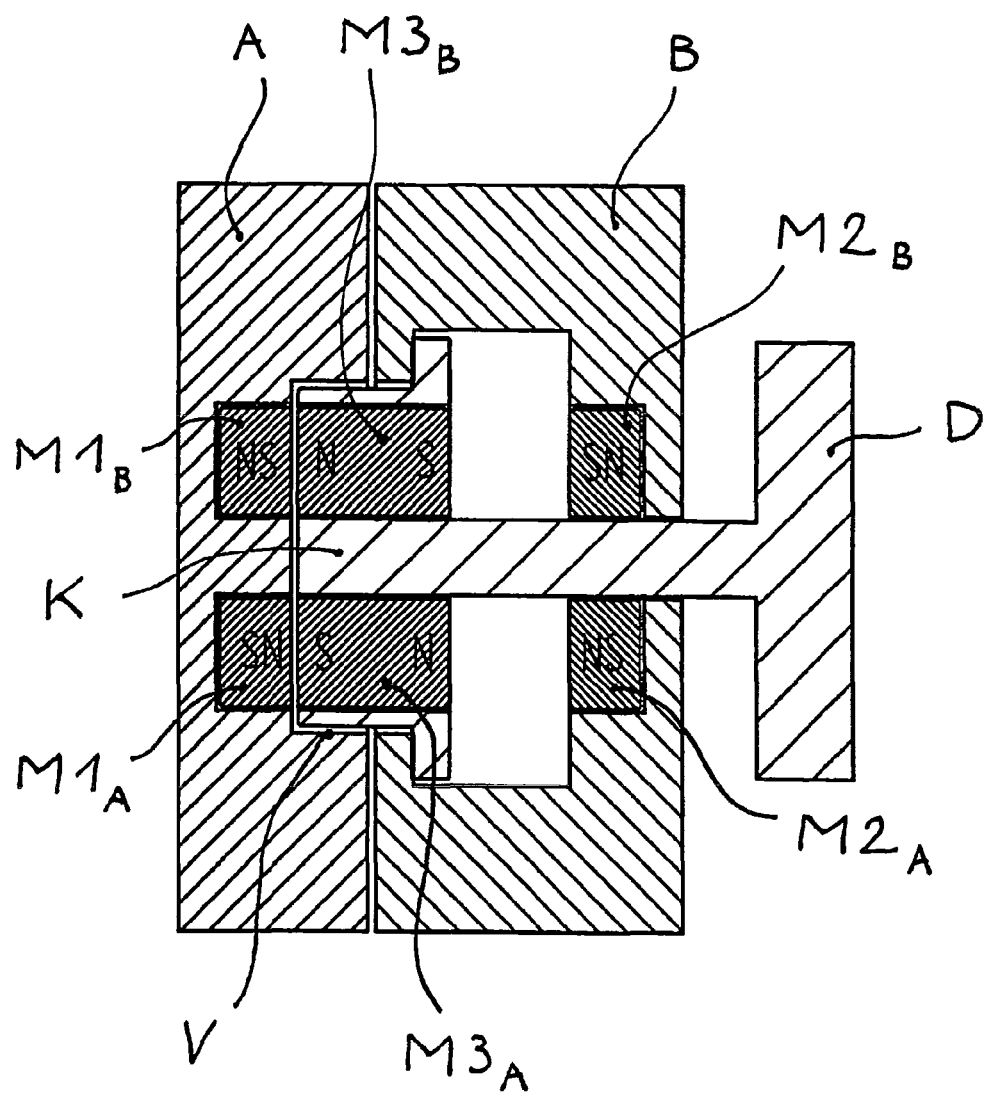
FIG. 4 shows a sectional view of the rotary coupling device with coupled elements.

FIG. 4 shows a sectional view of the rotary coupling device with coupled elements A and B, wherein the coupling element K is in the coupling position in which magnetic system M3 and magnetic system M2 are in repulsion and magnetic system M1 and magnetic system M3 are in attraction. In this embodiment a positive connection exists between the elements A and B in addition to the magnetic connection, in that in the coupling position the coupling element K prominently protrudes from the element B and engages in the depression V in element A, and elements A and B thus are secured against transverse pull.

Figure 5:
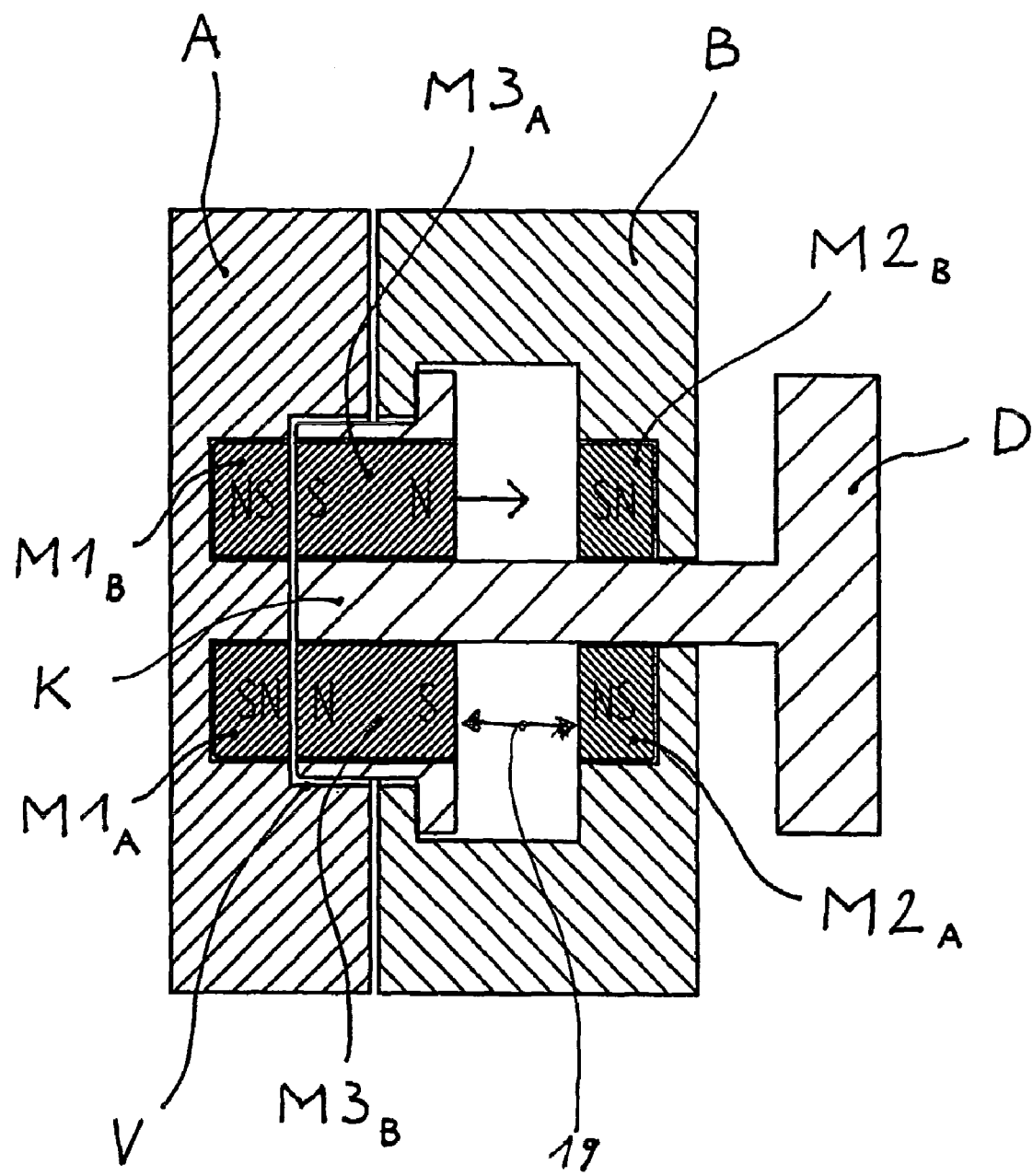
FIG. 5 shows another sectional view of the rotary coupling device.
Figure 6:
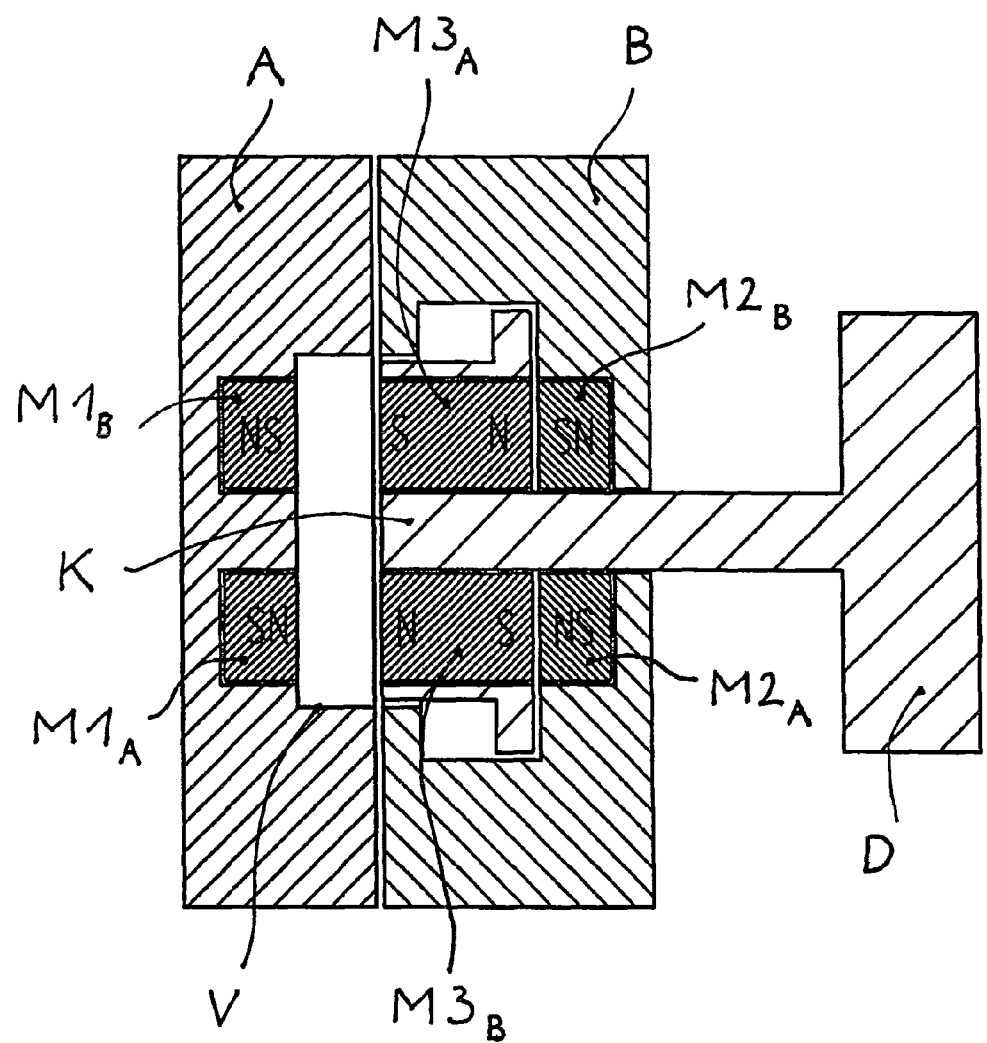
FIG. 6 shows another sectional view of the rotary coupling device.

By means of the turning handle D, which is firmly connected with the coupling element K, the coupling element K can be rotated in the second degree of freedom such that, as shown in FIG. 5, the magnetic systems M1 and M3 move into the unstable position of repulsion and as a result, in the first degree of freedom about the play 19, the coupling element K moves in direction of arrow from the coupling position into the decoupling position, which is shown next in FIG. 6 and in which magnetic system M3 and magnetic system M2 are in attraction and magnetic system M1 and magnetic system M3 are in repulsion.

Figure 7:
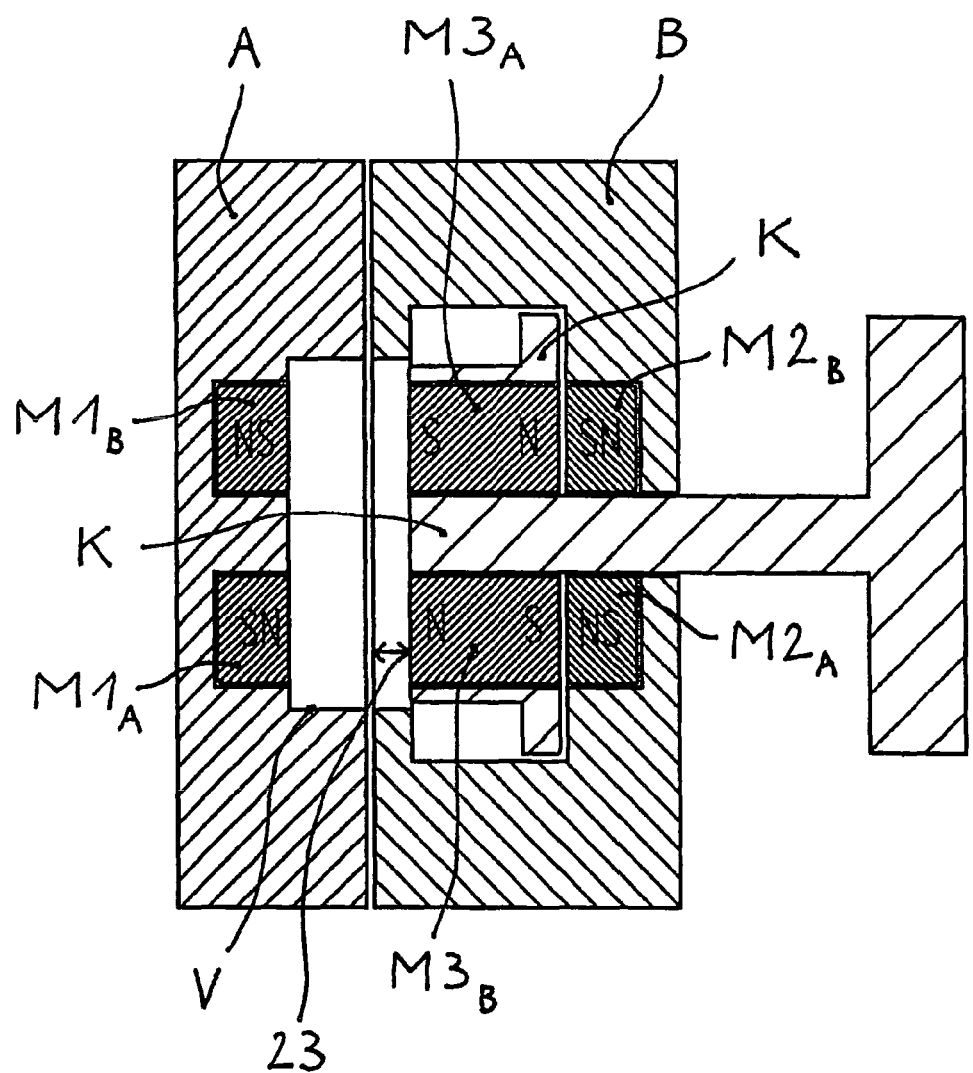
FIG. 7 shows in a sectional view another embodiment of a rotary coupling device.

FIG. 7 shows an advantageous development of the invention, in which in the decoupling position the coupling element K is retracted into element B to such an extent that the magnets M3a/b have a safety distance 23 to magnetic stripes, for example credit cards, inadvertently getting in contact with element B.

Figure 8:
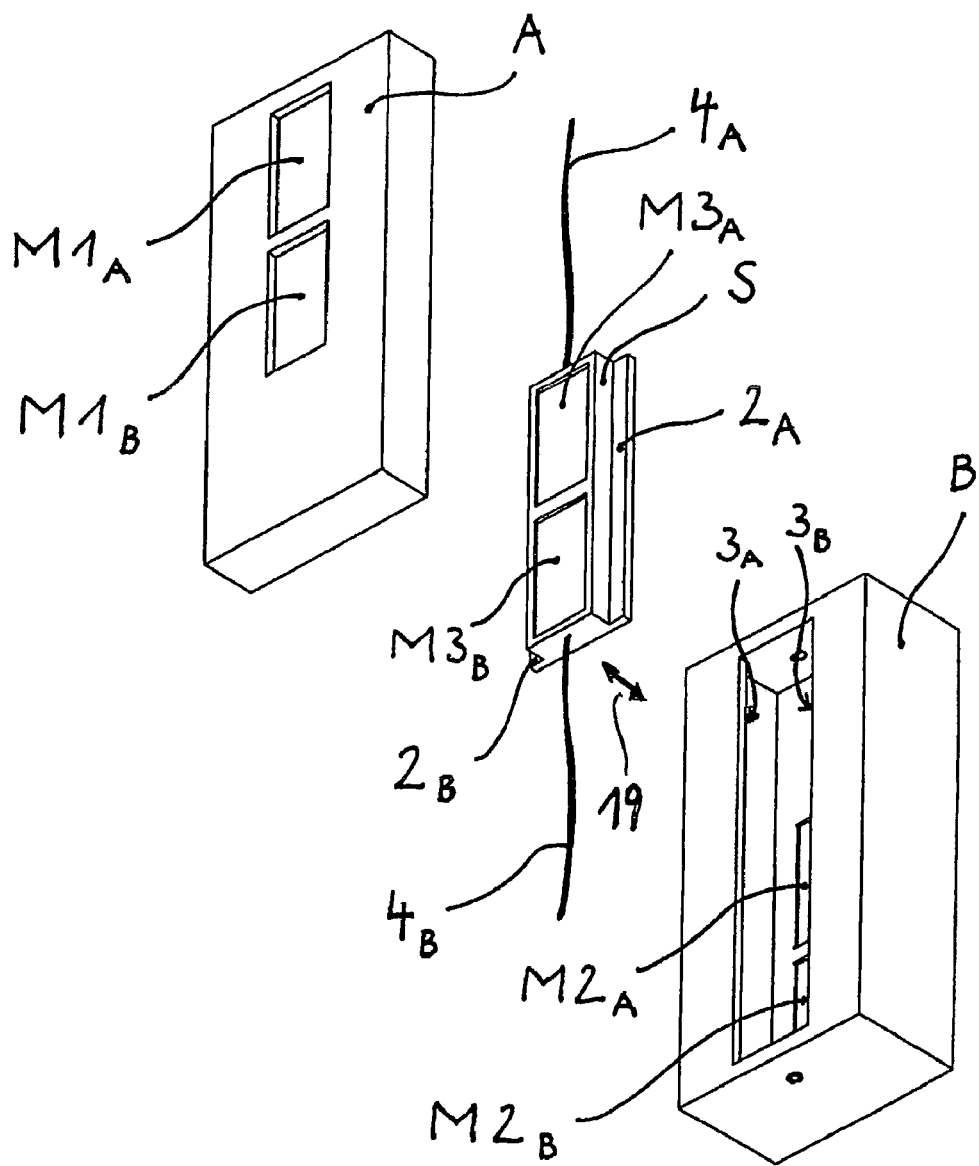
FIGS. 8 to 10 show views of an embodiment of a sliding coupling device.
Figure 9:
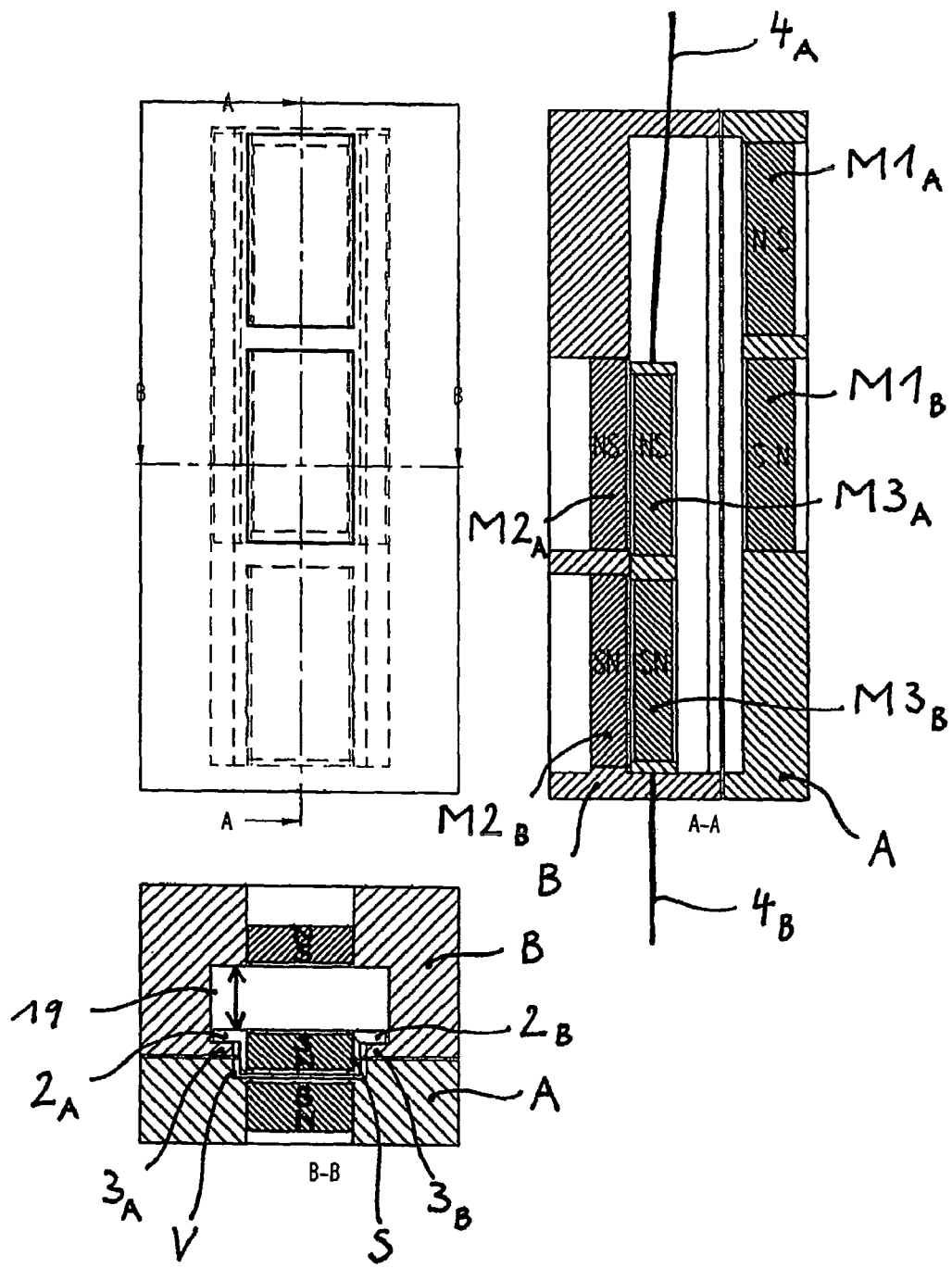
Figure 10:
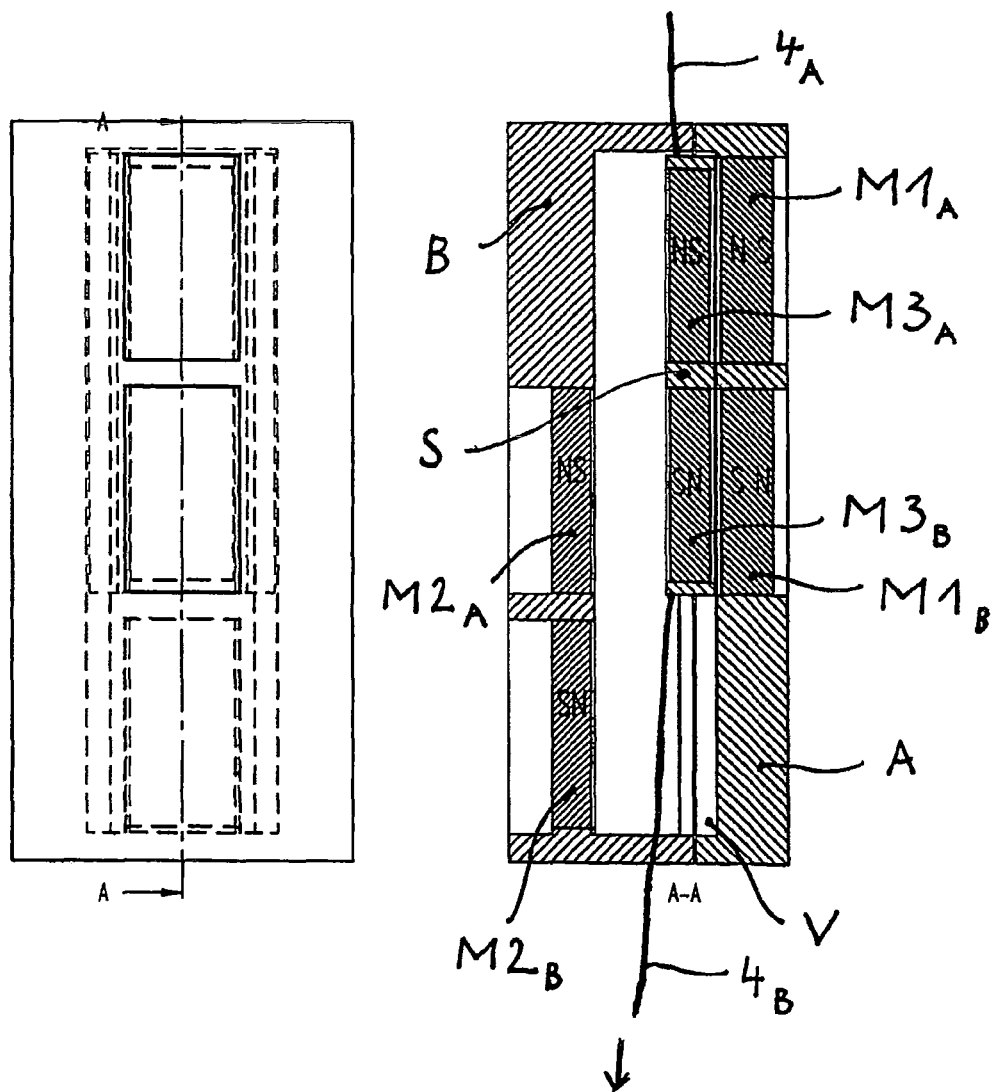

FIGS. 8 to 10 show an embodiment of the invention as sliding coupling device.

FIG. 8 shows an exploded representation of this embodiment. In detail, the same consists of the element A with the magnetic system M1 comprising the magnets M1a and M1b and the element B with the magnetic system M2 comprising the magnets M2a and M2b, and of the sliding coupling element S with the magnetic system M3 comprising the magnets M3a and M3b with two magnetic poles on the front side and two magnetic poles on the rear side. The sliding coupling element S can be moved in element B in a first degree of freedom about the play 19 limited to the front by the stops 2a/b and 3a/b, and in a second degree of freedom can be shifted by the Bowden cables 4a and 4b by means of an input actuation.

FIG. 9 shows the sliding coupling in a cross-section B-B and in a longitudinal section A-A in the decoupling position. In the cross-section it can be seen how the stops 2a/b and 3a/b in the element B limit the movability of the sliding element S in the first degree of freedom to the play 19, and in the longitudinal section it can be seen that in the decoupling position magnetic system M3 and magnetic system M2 are in attraction and magnetic system M1 and magnetic system M3 are in repulsion.

By means of the Bowden cable 4a, the sliding coupling element S now can be shifted such that, as shown in FIG. 10, it is shifted into the coupling position in which magnetic system M3 and magnetic system M2 are in repulsion and magnetic system M1 and magnetic system M3 are in attraction.

By pulling the Bowden cable 4b in direction of arrow, the reverse movement is effected: The sliding coupling element S is repelled by element A and retracted into element B.

In this embodiment, a positive connection exists between the elements A and B in addition to the magnetic connection, in that in the coupling position the coupling element K prominently protrudes from the element B and engages in the depression V in element A, and elements A and B thus are secured against transverse pull.

FIGS. 11-15 show a special embodiment of a rotary coupling device of the invention, e.g. as a coupling device between a bag and a fixture mounted on the bicycle or as coupling device between a bag and a roller case.

Figure 11:
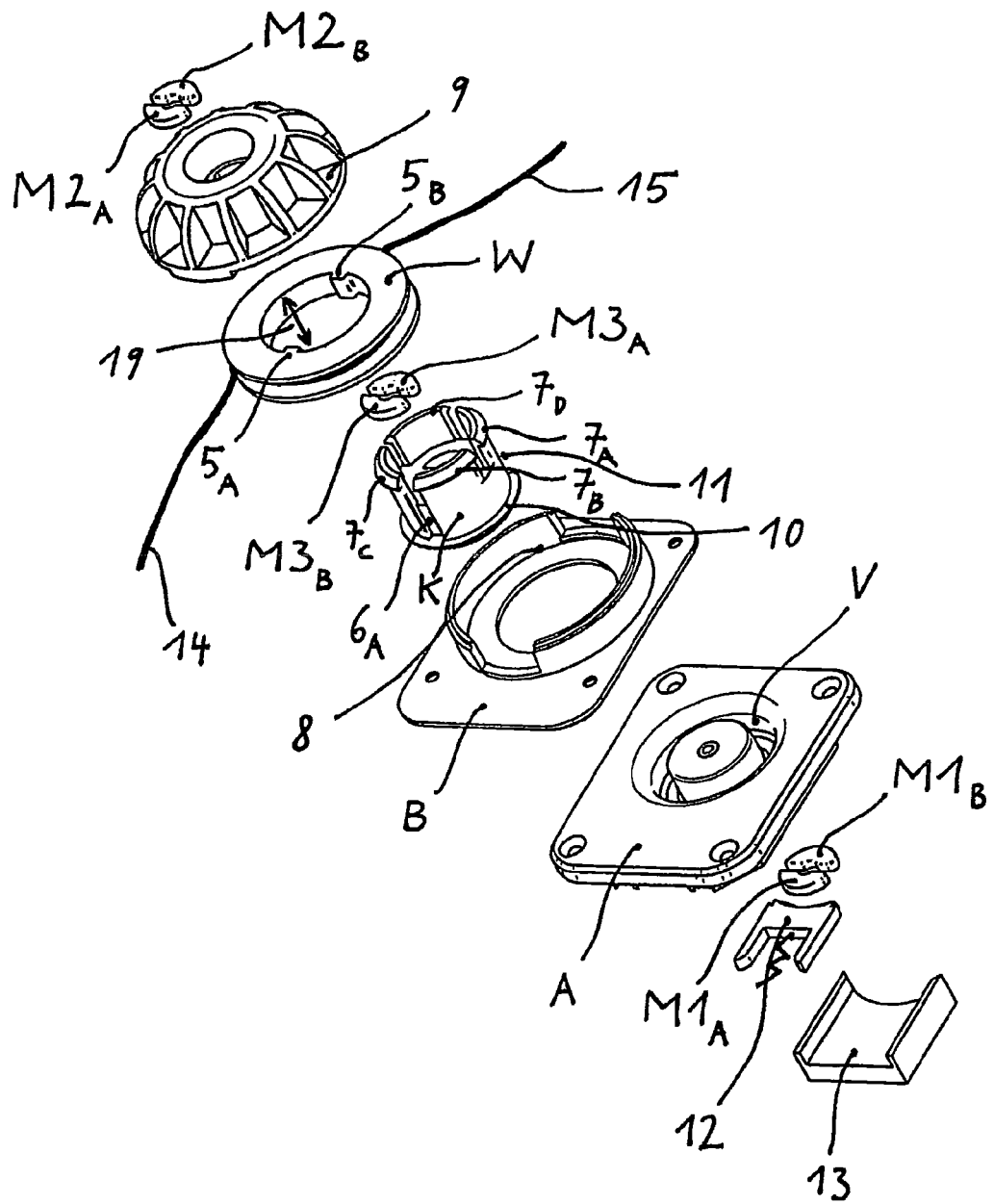

In FIG. 11 and FIG. 12 an exploded representation of the coupling device is shown in a front view and rear view. In element A the magnets M1a/b are arranged. In element B the coupling element K with the magnets M3a/b is arranged to be movable in two degrees of freedom. The coupling element K is limited to a play 19 in the first degree of freedom by means of the stop notches 7a/b/c/d and an abutment edge 10. An input actuation by the Bowden cable 14 is transmitted to the coupling element via the guide noses 5a/b of the winch W and the guides 6a/b in the coupling element K, so that in a second degree of freedom the coupling element K is rotated in the winch guide 8 together with the winch W. On the rear side, the winch is held by means of the cover 9, in which the magnets M2a/b are arranged.

The abutment edge 10 snaps into the coupling position behind the spring catch 12 and forms a positive lock. In the decoupling position, the recess in the abutment edge 11 is rotated to the position of the spring catch 12, so that locking is eliminated, whereas at the same time the magnetic systems M1 and M3 were poled for repulsion.

For a better understanding of the locking engagement and the play 19, only the coupling element K, the winch W and the spring catch 12 are shown in FIG. 12a. It can be seen that in the engaged condition the spring catch 12 engages behind the abutment edge 10, whereas in FIG. 12b the coupling element K has been rotated in the second degree of freedom to such an extent that the gap in the abutment edge 11 has released the spring catch 12. In this special embodiment of the invention, the resilient snapping back of the spring catch 12 is achieved by the cooperation of the elastic spring legs 27 and 28 and the force-deflecting triangle 26 firmly arranged in element A.

In FIG. 13a, FIG. 13b element A and element B are shown in a separated condition in a perspective view. In FIG. 13a, the coupling element K is in the coupling position, in which the magnetic system M3 and the magnetic system M2 are in repulsion and the coupling element prominently protrudes from element B and magnetic system M1 and magnetic system M3 are in attraction, whereby a magnetic coupling of element A and element B becomes possible.

FIG. 13b shows element B with coupling element K in a decoupling position, in which magnetic system M3 and magnetic system M2 are in attraction and the coupling element is retracted into element B.

FIG. 14 shows a sectional view and detail enlargement of the phase in which due to the actuation the coupling element K has been rotated in element B in the decoupling position in the second degree of freedom such that the magnets M1a/b and M3a/b have come into magnetic repulsion with respect to each other and as a result the coupling element K now is pushed out of element B. The rotation here is achieved in that pulling on the Bowden cable 14 placed around the winch W effects a rotation of the winch W, in that sufficient static friction has been produced between the tensioned Bowden cable 14 and the winch W. The tension on the one hand is achieved by the restoring rubber 15 and on the other hand by pulling on the Bowden cable 14.

FIG. 15 shows the coupling position in the same view. Here, the coupling element K has been moved into the depression V in the element A in the first degree of freedom about the play 19 due to the magnetic attraction between the magnetic system M1 and the magnetic system M3 and the repulsion between the magnetic system M2 and the magnetic system M3, and the abutment edge 10 of the coupling element K has snapped behind the spring catch 12, so that a positive connection between element A and element B has been obtained on all sides. When the Bowden cable 14 now is relieved again and hence the adhesion between the Bowden cable 14 and the winch W becomes smaller, the restoring rubber 15 retracts the Bowden cable 14 without the winch W being rotated, since the Bowden cable 14, the winch, the kind of winding and the magnetic systems M2 and M3 are designed such that the torque required for rotating the coupling element K (along with the resulting pole reversal of the magnetic systems M1 and M3) is greater than tstatic friction between Bowden cable 14 and winch W in the relaxed condition.

This configuration of the drive of the coupling element K in particular is quite convenient when, as shown in FIG. 15a, the coupling device couples a bag T to a roller case in such a way that the elements A and A' are arranged on the roller case RK and the elements B and B' are arranged on the bag T. In this case, the coupling elements K and K' are actuated via the handle G of the bag T with the Bowden cables 14 and 14' in the second degree of freedom. This provides the following functionality of the invention, which will be described below step by step:

The bag T is placed on the floor and is lifted at the handle G. By means of the handle, the Bowden cables 14, 14' are actuated and the coupling elements K, K' are rotated in the second degree of freedom, and due to the magnetic repulsion between magnetic system M3 and magnetic system M2 the coupling elements K, K' are pushed out of the elements B, B' into the coupling position in the first degree of freedom.

In the coupling position, the magnetic systems M3 and M1 are in a position of attraction and due to the magnetic force the bag T is pulled towards the element A arranged on the roller case, as soon as it moved into the vicinity thereof.

Now, the bag T is firmly coupled to the roller case RK. The handle G is released and the Bowden cables 14, 14' are pulled back into the rest position by the restoring rubbers 15, 15', without the coupling elements K, K' being rotated, since the static friction between the Bowden cable 14 and the winch W is designed smaller than the torque of the coupling element K attracting with M3 and M1 on element A, which is required for rotation.

When the handle G now is actuated again, the coupling elements K, K' are again rotated in the second degree of freedom, the gap in the abutment 11 releases the spring catch 12, M1 and M3 repel each other and M3 and M2 pull the coupling element K back into the decoupling position in B. Thus, the bag has been decoupled from the bicycle or from the suitcase and the coupling element K has been retracted into element B, without additional actions having been necessary.

Figure 16:
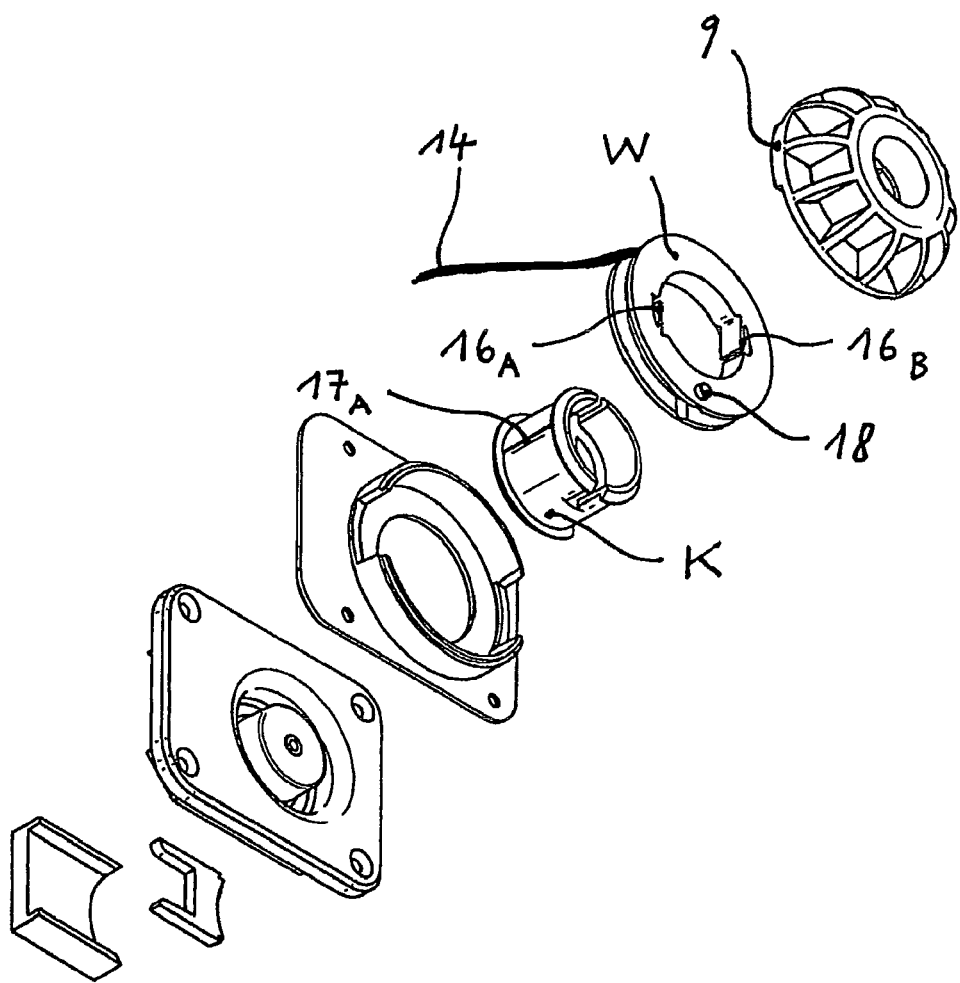
FIGS. 16 and 17 show exploded views of a coupling device.
Figure 17:
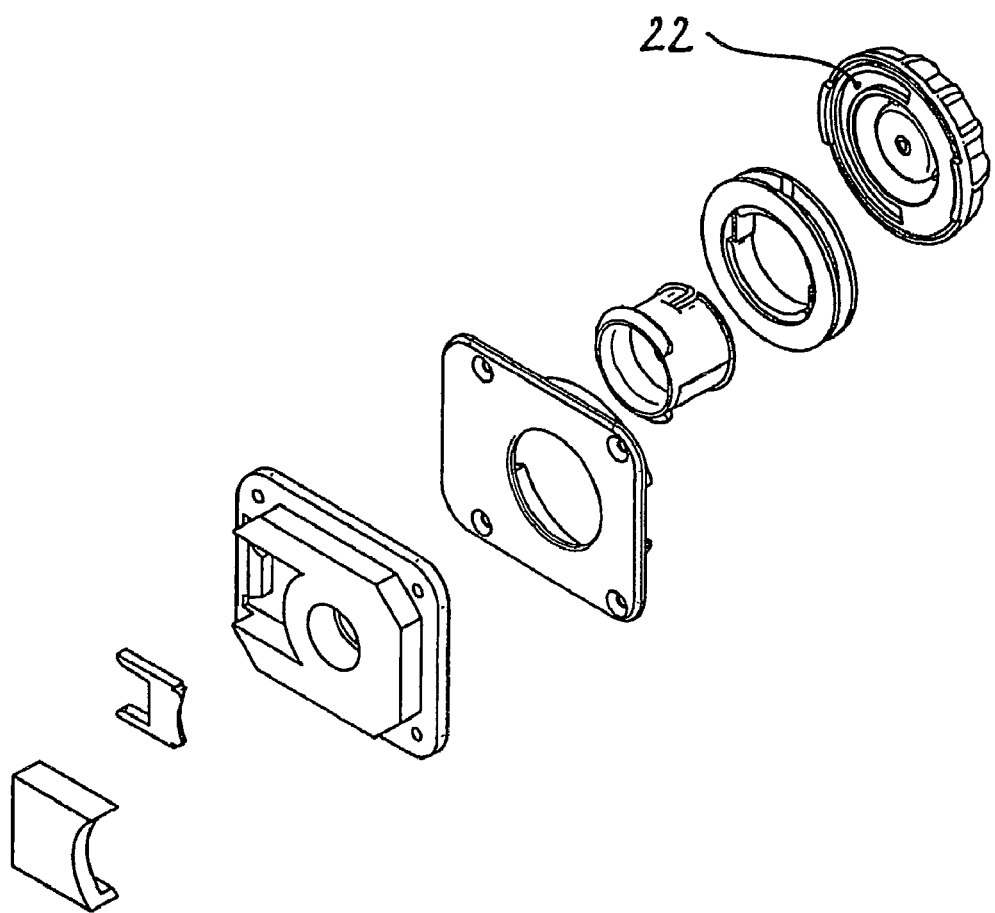

FIG. 16 now shows how the above described actuation of the coupling element between coupling position and decoupling position and back again into the coupling position is produced by a repeated actuation via a freewheel transmission between the winch W and the coupling element K. For this purpose, resilient locking pawls 16a/b are used, which can engage in protrusions 17a/b only in one direction of rotation. In this construction, the Bowden cable 14 is firmly connected with the winch in at least one point. In this case, it is expedient to limit the rotatability of the winch to about 180 degrees by means of a stop 18 which runs in a recess 22 (FIG. 17) in the cover 9. Here as well, the friction of the locking pawls 16a/b with the coupling element K in direction of reverse rotation must be designed such that the sliding friction of these elements is smaller than the magnetic holding torque between M2 and M3 and between M1 and M3.

An advantageous development consists in blocking the Bowden cable by an additional actuating element, so that inadvertent actuation of the coupling element is prevented during normal carrying of the bag.

It is clear to the skilled person that depending on the embodiment a multitude of variations of a winch drive with toothed racks, Bowden cables or rods with or without freewheel mechanism are possible.

It is furthermore clear to the skilled person that in a configuration as sliding coupling device a wide variety of drive solutions are conceivable here as well, which depending on the object can be accomplished by reciprocating the coupling element either by repeated actuation of the same actuating element or by reciprocating one actuating element or by actuation of two actuating elements acting from different sides.

FIG. 18 shows an embodiment of the invention as swivel coupling, in which the coupling element K is pivotally mounted about a tilting axis 21 on a circular path in the second degree of freedom.

It is clear to the skilled person that a magnetic system capable of pole reversal from attraction to repulsion can also be formed of a pair of one magnet and one ferromagnetic armature each, when in a position of attraction an armature and a magnet are opposed to attract each other and in a position of repulsion the two magnets are opposed to repel each other.

Figure 19:
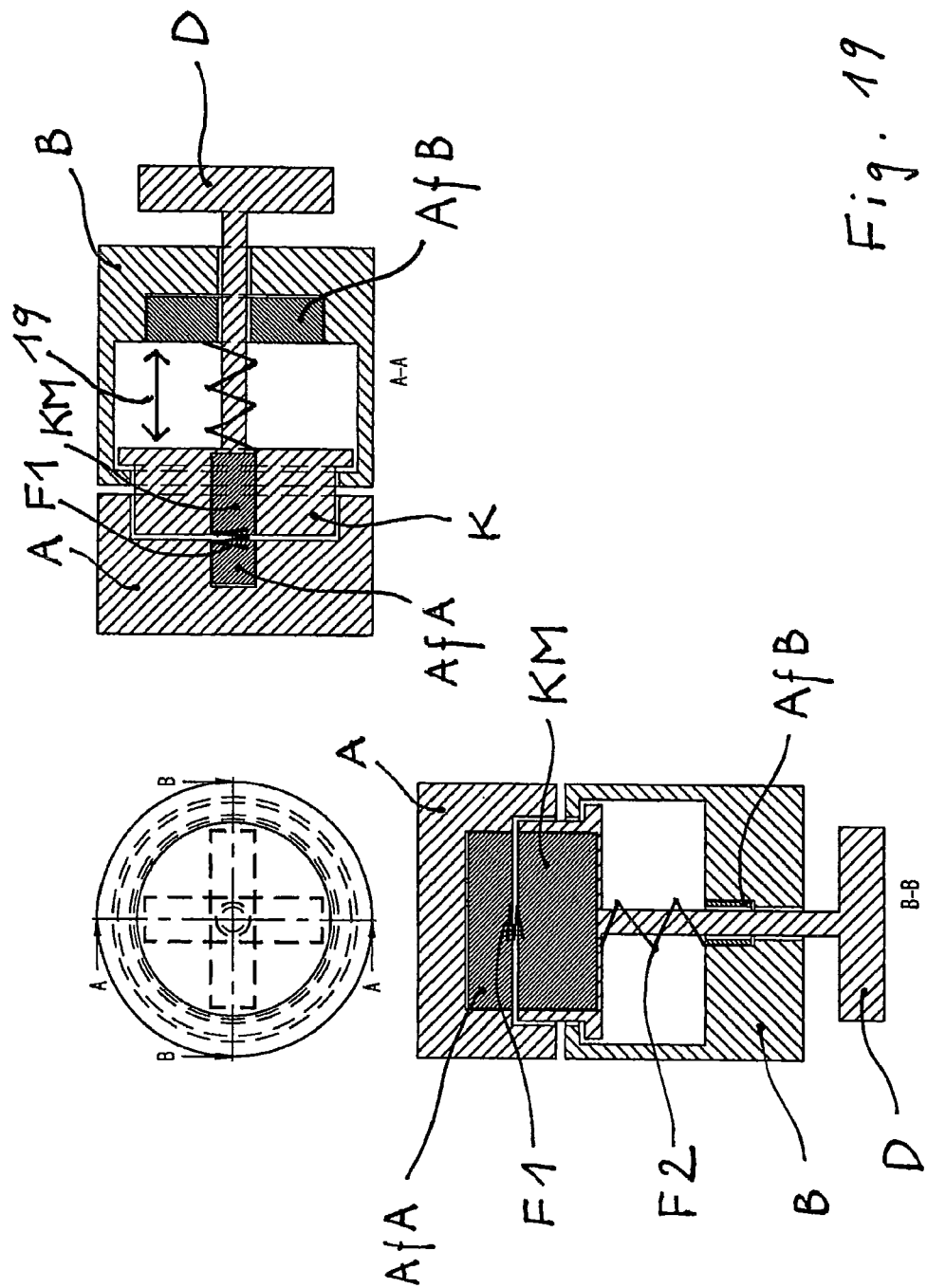
FIG. 19 shows views of a rotary coupling device.

FIG. 19 shows a general embodiment of the invention as a rotary coupling device in a sectional representation in the two sections A-A and B-B in a coupling position.

The coupling element K is movably mounted in element B in two degrees of freedom. In the first degree of freedom, the element K is movable about the play 19 between the coupling position and the decoupling position. In the second degree of freedom, the coupling element K can rotatingly be actuated via the turning handle D.

In element A an armature AfA and in element B an armature AfB is arranged. In the coupling element a magnet KM is arranged. In the coupling position, armature AfA and magnet KM are in a position of maximum overlap of armature and magnet and maximum attraction to each other. Armature AfB and magnet KM are in a position of minimum overlap and minimum attraction to each other.

Between the armature AfA and the element A and between the armature AfB and the element B, respectively, the springs F1 and F2 are arranged. The springs are dimensioned and arranged such that in the position of maximum overlap of AfA and KM the spring 1 is weaker than the force of attraction between AfA and KM, and in the position of minimum force of attraction between AfB and KM the spring 2 is stronger than the force of attraction between AfB and KM. Thus, the coupling element K is magnetically attracted and pushed by spring force to the element A, and element A and element B are magnetically coupled.

Element A and element B additionally are secured against transverse pull by positive connection between the coupling element K protruding from element B and the depression V.

Figure 20:
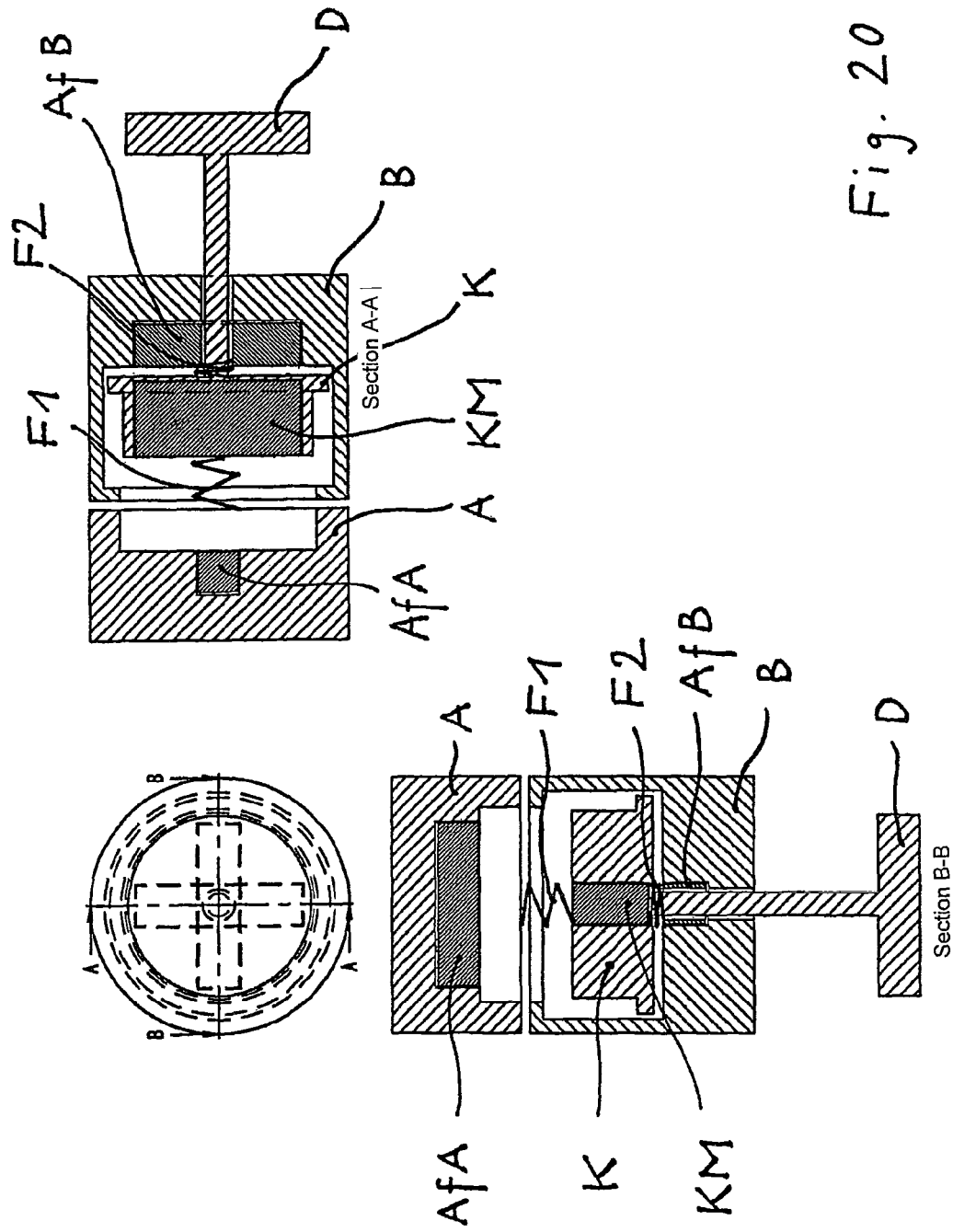
FIG. 20 shows another view of the coupling device according to FIG. 19.

FIG. 20 shows how after an actuation of the coupling element K via the turning handle D the rotary coupling device has been moved into the decoupling position.

In the decoupling position, the attraction between AfA and KM, which are in the position of minimum overlap, is weaker than the spring force of the spring 1 and the attraction between AfB and KM, which are in the position of maximum overlap, is stronger than the spring foce of the spring 2. Thus, the coupling element K is pulled/pushed towards the element B and element A and element B are magnetically decoupled.

In addition, the positive connection between element A and element B is eliminated, since the coupling element K is retracted into element B.

FIGS. 21-25 show a general embodiment of the invention as rotary coupling device.

Figure 21:
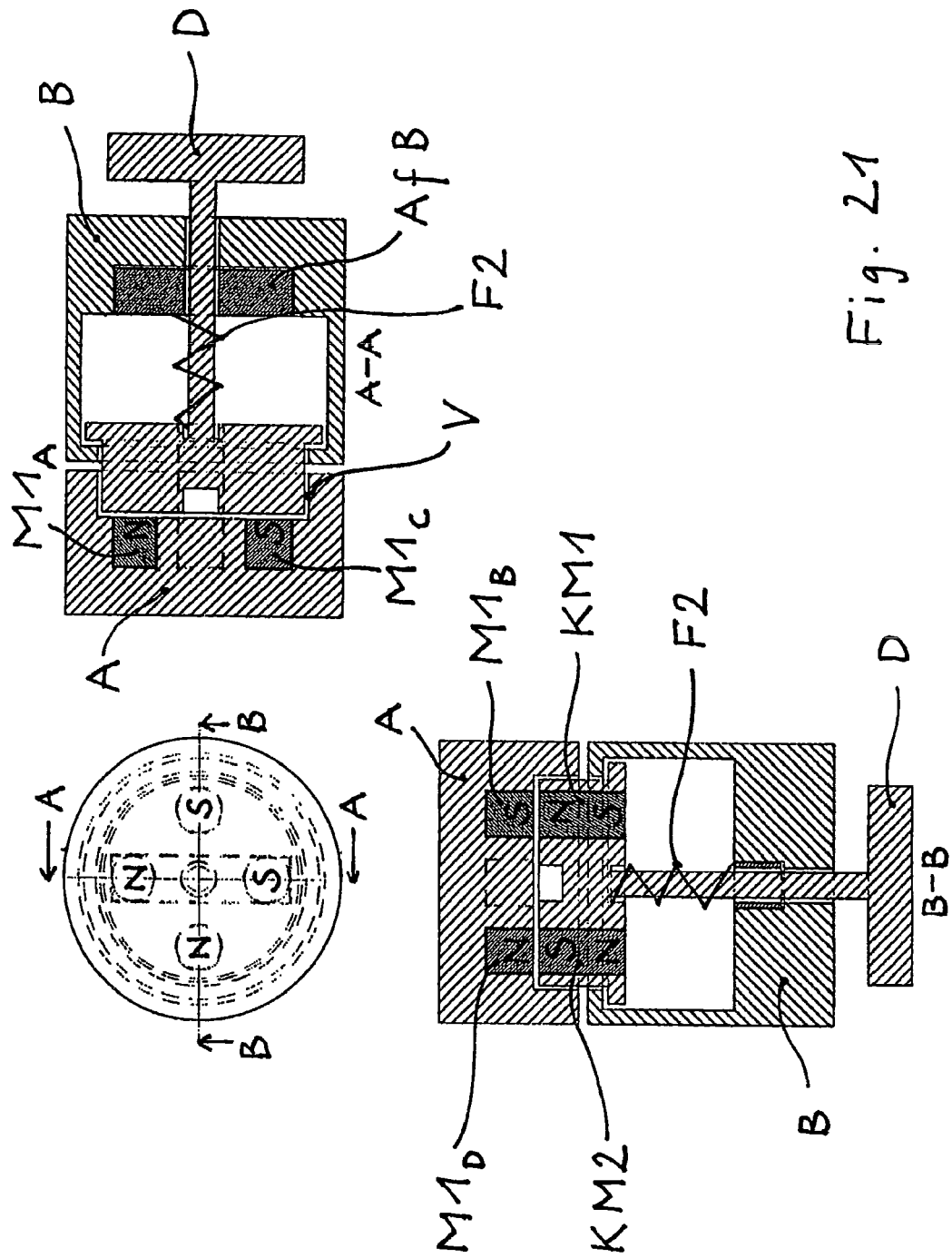

FIG. 21 shows a sectional representation in the two sections A-A and B-B. The coupling element K is movably mounted in element B in two degrees of freedom. In the first degree of freedom, the element K is movable about the play 19 between the coupling position and the decoupling position. In the second degree of freedom, the coupling element K can rotatingly be actuated via the turning handle D.

In element A a magnetic system M1 comprising the magnets M1*a,b,c,d* and in element B an armature AfB is arranged. In the coupling element K two magnets KM1 and KM2 are arranged. In the illustrated coupling position, magnetic system M1 and magnetic system KM are in a position of mutual attraction. Armature AfB and magnetic system KM are in a position of minimum overlap and minimum attraction to each other.

Between the armature AfB and the element B the spring F2 is arranged. The spring is dimensioned and arranged such that in the illustrated position of minimum overlap of AfB and KM it is stronger than the force of attraction between AfB and KM. Thus, the coupling element K is pulled/pushed towards the element A and element A and element B are magnetically coupled.

Element A and element B additionally are secured against transverse pull by means of the positive connection between the coupling element K protruding from element B and the depression V.

Figure 22:
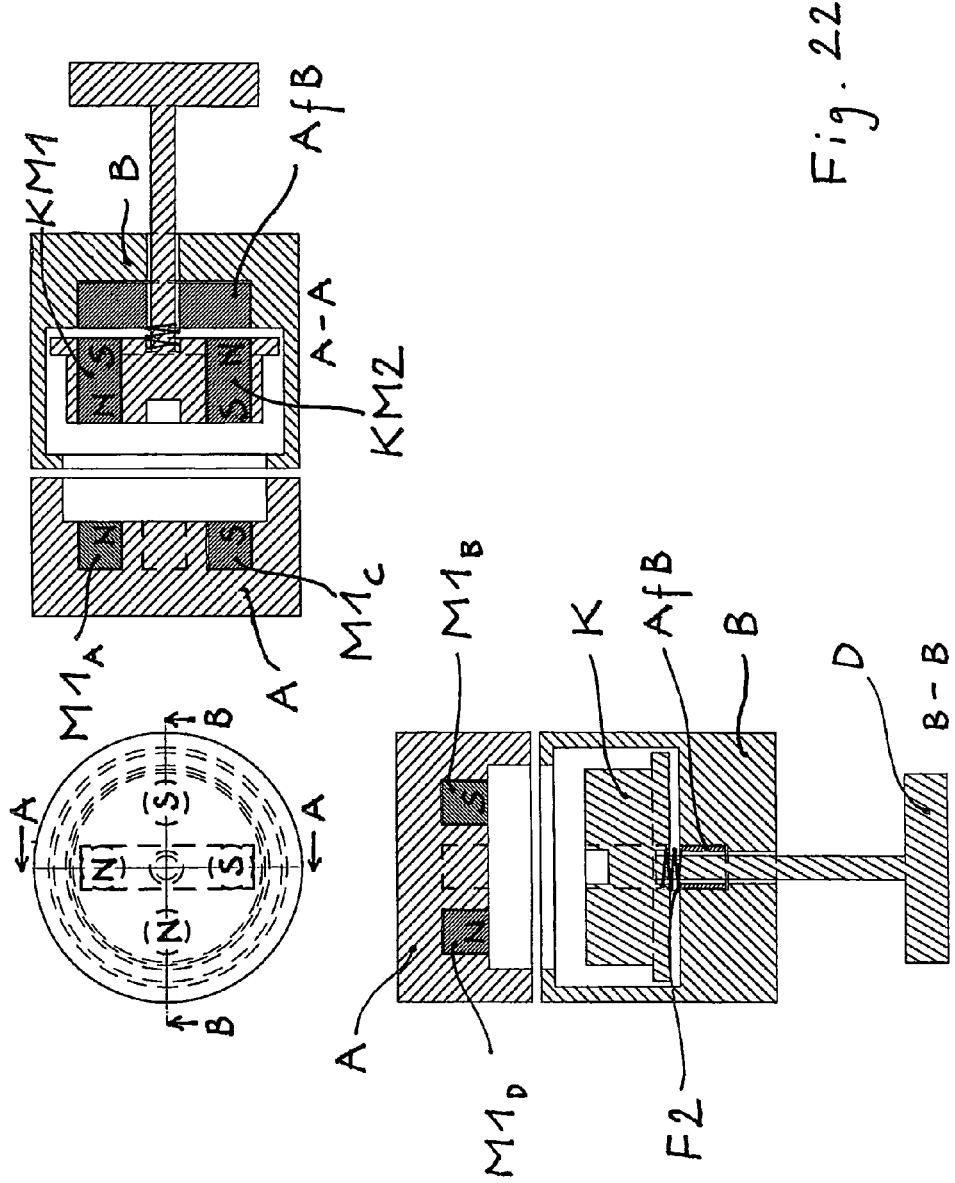

In a sectional representation in the two sections A-A and B-B FIG. 22 shows how after an actuation of the coupling element K via the turning handle D the rotary coupling device has been moved into the decoupling position.

In the illustrated coupling position, magnetic system M1 and magnetic system KM are in a position of mutual repulsion. The armature AfB and the magnetic system KM are in a position of maximum overlap and maximum attraction to each other.

The spring 2 between the armature AfB and the element B is dimensioned and arranged such that in the illustrated position of maximum overlap of AfB and KM it is weaker than the force of attraction between AfB and KM. Thus, the coupling element K is pulled/pushed towards the element B and element A and element B are magnetically decoupled.

In addition, the positive connection between element A and element B is eliminated, since the coupling element K is retracted into element B.

FIG. 23 shows the elements A and B in a coupling position with mutual magnetic attraction in a perspective view with elements separated from each other.

Figure 24:
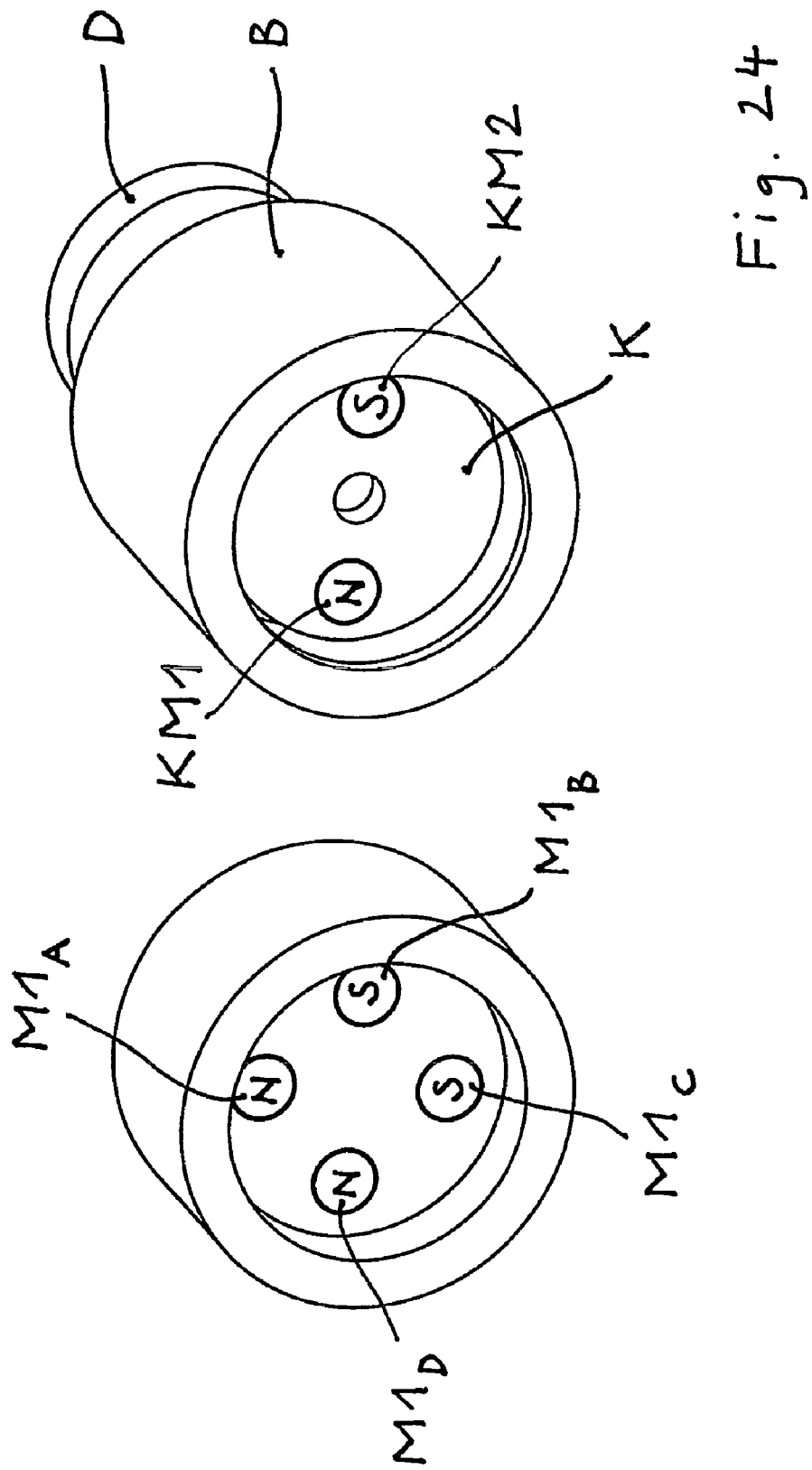

FIG. 24 shows the elements A and B in a decoupling position with mutual magnetic repulsion in a perspective view with elements separated from each other.

FIG. 25 shows a perspective exploded representation.

The invention claimed is:

1. A magnetic coupling device, comprising a first element and a second element, wherein the first and the second elements either are integrally connected with the objects to be coupled or are mounted on the objects, the coupling device comprising:
- a coupling element coupling the first element and the second element, wherein
  the coupling element is movable on the second element in two degrees of freedom in that
    in a first of the two degrees of freedom the coupling element is movable axially between a coupling position and a decoupling position and
    in a second of the two degrees of freedom the coupling element is displaceable by means of an input actuation;
- a first magnetic system, which is arranged on the first element and comprises at least two magnets or a magnet arrangement with two magnetic poles;
- a second magnetic system, which is arranged on the coupling element and comprises two magnets or a magnet arrangement with at least four magnetic poles, of which at least two magnetic poles are arranged on the front side of the coupling element facing the first magnetic system, wherein by means of the input actuation in the second degree of freedom the coupling element is moved in the first degree of freedom from the coupling position, in which the coupling element is in attraction to the first element, into the decoupling position, in which the coupling element is in repulsion to the first element; and
- a third magnetic system, which is arranged on the second element and comprises at least two magnets or a magnet arrangement with two magnetic poles, wherein in the second magnetic system of the coupling element at least two magnetic poles are arranged on the rear side facing the third magnetic system, wherein by means of the input actuation in the second degree of freedom the coupling element is moved in the first degree of freedom from the coupling position, in which the coupling element is in repulsion to the second element, into the decoupling position, in which the coupling element is in attraction to the second element.

2. The magnetic coupling device according to claim 1, wherein the coupling element is rotated by means of the input actuation in the second degree of freedom.

3. The magnetic coupling device according to claim 1, wherein the coupling element is linearly shifted by means of the input actuation in the second degree of freedom.

4. The magnetic coupling device according to claim 1, wherein the coupling element is swiveled on a circular path about its center by means of the input actuation in the second degree of freedom.

5. The magnetic coupling device according to claim 1, wherein the coupling element prominently protrudes from the second element in the coupling position and forms a positive connection with a depression of the first element, thereby mechanically securing the first and the second elements relative to each other against a transverse pull.

6. A magnetic coupling device, comprising a first element and a second element, wherein the first and the second elements either are integrally connected with the objects to be coupled or are mounted on the objects, the coupling device comprising:
- a coupling element coupling the first element and the second element, wherein
  the coupling element is movable on the second element in first and second degrees of freedom in that in the first degree of freedom the coupling element is movable axially between a coupling position and a decoupling position and
  in the second degree of freedom the coupling element is displaceable by means of an input actuation;
- a first armature arranged in the first element;
- a first magnet arranged in the coupling element;
- a first spring arranged between the first armature and the first magnet, wherein by means of the input actuation in the second degree of freedom the coupling element is moved from a position of maximum overlap of the first armature and the first magnet and maximum attraction into a position of minimum overlap and minimum force of attraction, wherein the first spring is dimensioned and arranged such that
  in the position of maximum overlap it is weaker than the maximum magnetic attraction of the first armature and the first magnet, so that the first armature and the first magnet approach each other, and in the condition of minimum overlap it is stronger than the minimum force of attraction between the first armature and the first magnet, so that the first armature and the first magnet repel each other by the first spring, wherein by means of the input actuation in the second degree of freedom the coupling element is moved in the first degree of freedom from the coupling position, in which the coupling element is in attraction to the first element, into the decoupling position, in which the coupling element is in repulsion to the first element;

a second armature is arranged on the second element; and a second spring arranged between the coupling element with the first magnet and the second armature, wherein by means of the input actuation in the second degree of freedom the coupling element is moved from a position of maximum overlap of the second armature and the first magnet and maximum attraction into a position of minimum overlap and minimum attraction, wherein the second spring is dimensioned and arranged such that in the position of maximum overlap it is weaker than the maximum magnetic attraction of the second armature and the first magnet, so that the second armature and the first magnet approach each other, and in the condition of minimum overlap it is stronger than the minimum force of attraction between the second armature and the first magnet, so that the second armature and the first magnet repel each other by the second spring, wherein by means of the input actuation in the second degree of freedom the coupling element is moved in the first degree of freedom from the coupling position, in which the coupling element is in repulsion to the second element, into the decoupling position, in which the coupling element is in attraction to the second element.

7. The magnetic coupling device according to claim 6, wherein the coupling element is rotated by means of the input actuation in the second degree of freedom.

8. The magnetic coupling device according to claim 6, wherein the coupling element is linearly shifted by means of the input actuation in the second degree of freedom.

9. The magnetic coupling device according to claim 6, wherein the coupling element is swiveled on a circular path about its center by means of the input actuation in the second degree of freedom.

10. The magnetic coupling device according to claim 6, wherein the coupling element prominently protrudes from the second element in the coupling position and forms a positive connection with a depression of the first element, thereby mechanically securing the first and the second elements relative to each other against a transverse pull.

11. A magnetic coupling device, comprising a first element and a second element, wherein the first and the second elements either are integrally connected with the objects to be coupled or are mounted on the objects, and the coupling device comprising:

a coupling element coupling the first element and the second element, wherein the coupling element is movable on the second element in first and second degrees of freedom in that in the first degree of freedom the coupling element is movable axially between a coupling position and a decoupling position and in the second degree of freedom the coupling element is displaceable by means of an input actuation, a first magnetic system, which is arranged on the first element and comprises at least two magnets or a magnet arrangement with two magnetic poles;

a second magnetic system, which is arranged on the coupling element and comprises two magnets or a magnet arrangement with at least two magnetic poles, of which at least two magnetic poles are arranged on the front side of the coupling element facing the first magnetic system, wherein by means of the input actuation in the second degree of freedom the coupling element is moved in the first degree of freedom from the coupling position, in which the coupling element is in attraction to the first element, into the decoupling position, in which the coupling element is in repulsion to the first element;

an armature, which is arranged on the second element; and a spring, which is arranged between the coupling element comprising the second magnetic system and the armature, wherein by means of the input actuation in the second degree of freedom the coupling element is moved from a position of maximum overlap of the armature and the second magnetic system and maximum attraction into a position of minimum overlap and minimum attraction, wherein the spring is dimensioned and arranged such that in the position of maximum overlap it is weaker than the maximum magnetic attraction of the armature and the second magnetic system, so that the armature and the magnet approach each other, and in the condition of minimum overlap it is stronger than the minimum force of attraction between the armature and the second magnetic system, so that the armature and the second magnetic system repel each other by the spring, wherein by means of the input actuation in the second degree of freedom the coupling element is moved in the first degree of freedom from the coupling position, in which the coupling element is in repulsion to the second element, into the decoupling position, in which the coupling element is in attraction to the second element.

12. The magnetic coupling device according to claim 11, wherein the coupling element K is rotated by means of the input actuation in the second degree of freedom.

13. The magnetic coupling device according to claim 11, wherein the coupling element K is linearly shifted by means of the input actuation in the second degree of freedom.

14. The magnetic coupling device according to claim 11, wherein the coupling element K is swiveled on a circular path about the center by means of the input actuation in the second degree of freedom.

15. The magnetic coupling device according to claim 11, wherein the coupling element K prominently protrudes from the element B in the coupling position and forms a positive connection with a depression V in element A, which mechanically secures the elements A and B against transverse pull.

* * * * *

UNITED STATES PATENT AND TRADEMARK OFFICE
CERTIFICATE OF CORRECTION

PATENT NO.       : 8,368,494 B2                                              Page 1 of 1
APPLICATION NO. : 12/745808
DATED            : February 5, 2013
INVENTOR(S)      : Joachim Fiedler It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 214 days.

Signed and Sealed this

First Day of September, 2015

Michelle K. Lee
*Director of the United States Patent and Trademark Office*